United States Patent
Matsumoto et al.

(10) Patent No.: US 12,083,752 B2
(45) Date of Patent: Sep. 10, 2024

(54) METHOD FOR MANUFACTURING STRUCTURE AND STRUCTURE

(71) Applicant: GRAPHITE DESIGN INC., Chichibu (JP)

(72) Inventors: Keizo Matsumoto, Chichibu (JP); Yuichiro Matsuzaki, Chichibu (JP); Ryuta Tsujimoto, Chichibu (JP)

(73) Assignee: GRAPHITE DESIGN INC., Chichibu (JP)

( * ) Notice: Subject to any disclaimer, the term of this patent is extended or adjusted under 35 U.S.C. 154(b) by 302 days.

(21) Appl. No.: 17/636,189

(22) PCT Filed: Aug. 21, 2020

(86) PCT No.: PCT/JP2020/031651
§ 371 (c)(1),
(2) Date: Feb. 17, 2022

(87) PCT Pub. No.: WO2021/039637
PCT Pub. Date: Mar. 4, 2021

(65) Prior Publication Data
US 2022/0288872 A1    Sep. 15, 2022

(30) Foreign Application Priority Data

Aug. 26, 2019 (JP) .................. 2019-153414
Feb. 12, 2020 (JP) .................. 2020-021562

(51) Int. Cl.
*B29C 70/46* (2006.01)
*B29C 70/30* (2006.01)
(Continued)

(52) U.S. Cl.
CPC .............. *B29C 70/46* (2013.01); *B29C 70/30* (2013.01); *B29C 70/32* (2013.01); *B29K 2101/10* (2013.01)

(58) Field of Classification Search
CPC ..................................................... B29C 70/46
See application file for complete search history.

(56) References Cited

U.S. PATENT DOCUMENTS 3,844,822 A * 10/1974 Boss ................. B29C 70/04
427/377
4,200,125 A * 4/1980 Hush ................ B29C 48/91
138/125
(Continued)

FOREIGN PATENT DOCUMENTS

CN    106217915 A    12/2016
JP    S63193811 A    8/1988
(Continued)

OTHER PUBLICATIONS

International Search Report for corresponding Application No. PCT/JP2020/031651, mailed Sep. 15, 2020.
Written Opinion for corresponding Application No. PCT/JP2020/031651, mailed Sep. 15, 2020.
Extended European Search Report for corresponding European Application No. 20856121.7 dated Feb. 2, 2024.

*Primary Examiner* — Andrew T Piziali
(74) *Attorney, Agent, or Firm* — Renner, Otto, Boisselle & Sklar, LLP

(57) ABSTRACT

Provided are a method for manufacturing a structural body and a structural body, the structural body formed of FRP and having a high degree of freedom in cross-sectional shape even at a low cost. The method for manufacturing a structural body includes a winding step of forming a cylindrical laminate body LM by winding a plurality of composite materials including reinforcing fibers and an uncured thermosetting resin around a hollow cylindrical core member CY; a compressing step of winding a tape or film around an outer circumference of the laminate body LM and compressing the same; a preheating step of heating the laminate body LM until a state prior to complete curing of the thermoset-
(Continued)

ting resin; and a main heating step of arranging the laminate body LM around which the tape or film is wound and the cylindrical core member in a molding die and pressing the same to thereby heat the laminate body LM until the thermosetting resin is completely cured while deforming the cylindrical core member CY to a non-circular cross-sectional shape. Thereby, a structural body in which the cylindrical core member CY and the laminate body LM are integrated can be formed.

9 Claims, 17 Drawing Sheets

(51) Int. Cl.
*B29C 70/32* (2006.01)
*B29K 101/10* (2006.01)

(56) References Cited

U.S. PATENT DOCUMENTS

| | | | | |
|---|---|---|---|---|
| 5,262,212 A | * | 11/1993 | Waters | B29C 70/025 524/145 |
| 2002/0011047 A1 | * | 1/2002 | Obeshaw | B29D 24/004 428/116 |
| 2006/0048440 A1 | * | 3/2006 | Harder | A01K 91/12 43/44.98 |
| 2016/0354970 A1 | | 12/2016 | Taki | |
| 2018/0036866 A1 | * | 2/2018 | Alkhas | B24D 3/14 |

FOREIGN PATENT DOCUMENTS

| | | |
|---|---|---|
| JP | 2006-159457 A | 6/2006 |
| JP | 6747722 B | 8/2020 |

* cited by examiner

METHOD FOR MANUFACTURING STRUCTURE AND STRUCTURE

TECHNICAL FIELD

The present invention relates to a method for manufacturing a structural body, and a structural body.

BACKGROUND ART

Heretofore, metallic structural bodies have been used frequently for motorcycles, automobiles and the like, but a new structural body that realizes both high intensity and reduced weight that corresponds to electrification of vehicles that has been promoted in the recent years and that replaces the relatively heavy metallic structural body is desired. Fiber Reinforced Plastics (FRP), which is a material having high strength and relatively low weight, is known, and as an example, hollow cylindrical members made of FRP are already used for bicycle frames or the like.

Depending on the structural body, there is a case where a cross-sectional shape of the body orthogonal to a longitudinal direction should be varied locally in the longitudinal direction so as to prevent interference with surrounding components, for example. Such structural body is referred to as a modified cross-section structural body. Further, if multiple structural bodies are integrated for use that requires ensured strength, there may be a case where a polygonal cross-section is preferred so as to minimize gaps formed between adjacent structural bodies. Such structural body is referred to as a polygonal cross-section structural body. It is preferable to form a modified cross-section structural body or a polygonal cross-section structural body using FRP, since the purpose of use thereof is expanded thereby.

A modified cross-section structural body or a polygonal cross-section structural body made of FRP can be obtained, even according to the conventional technique, by adopting a manufacturing process of arranging a collapsed core and the like wrapped in a prepreg of fiber-reinforced resin in a molding die having an inner shape corresponding to a desired outer shape, and molding and thermally curing the prepreg while applying pressure in an autoclave, a press machine or the like. The collapsed core or the like inside the structural body can be removed through an opened end of the structural body by collapsing after the manufacturing process.

However, if a modified cross-section structural body or a polygonal cross-section structural body made of FRP is molded via such manufacturing process, there is a risk that appearance defects such as wrinkles, voids, and resin rich caused by reinforcing fibers that cannot conform to shape change may occur when the wall thickness of the prepreg changes during the pressurizing and heating process at the time of molding.

Moreover, if the molding die has a complex shape, an operation of stably placing the prepreg uniformly along the shape of the molding die is difficult, and especially at areas in which adapting to the molding die is difficult, such as a corner portion, resin rich and voids tend to occur. Such problems not only deteriorate the quality of appearance, but also cause dispersion of product quality such as the strength of the component.

With respect to this problem, Patent Document 1 discloses a technique for forming an FRP-made structural body having an arbitrary hollow cross-sectional shape. According to the technique disclosed in Patent Document 1, a hollow core having a reinforcing fiber base material disposed on its outer circumference is disposed in a cavity of a molding die, and after the mold is clamped, a resin is injected into the molding die while pressurizing the inside of the core, whereby an FRP structural body having an outer shape corresponding to the mold, that is, having a modified cross-section or a polygonal cross-section, can be molded.

CITATION LIST

Patent Literature

[Patent Document 1] Japanese Patent Application Laid-Open Publication No. 2006-159457

DISCLOSURE OF THE INVENTION

Problems to be Solved by the Invention

According to the technique of Patent Document 1, by injecting a resin into a molding die while pressurizing a hollow core disposed in the molding die, it is ostensibly possible to prevent problems such as wrinkles or voids from occurring in an FRP hollow structural body having an arbitrary hollow cross-section. However, such a technique has a problem in that large-scale equipment such as a resin flow path for injecting resin into the molding die is required, resulting in a high cost.

Further according to the technique of Patent Document 1, after manufacture, it is necessary to form a relatively large opening to remove the hollow core from the end of the FRP hollow structural body, so that the opening may be an obstacle depending on the use of the structural body. Especially, in the case of a modified cross-section structural body having both ends closed, the collapsed core or the hollow core cannot be removed after manufacture, so that the core remains within the structural body, according to which drawbacks such as weight gain or abnormal noise occur. Therefore, a technique of manufacturing a structural body made of FRP from a viewpoint that differs from the prior art technique is desired.

It is therefore an object of the present invention to provide a method for manufacturing a structural body and a structural body made of FRP that offer high degree of freedom of the cross-sectional shape despite being low cost.

Means of Solving the Problems

In order to achieve the objects described above, a method for manufacturing a structural body according to the present invention includes
a winding step of forming a cylindrical laminate body by winding a plurality of composite materials including reinforcing fibers and an uncured thermosetting resin around a hollow cylindrical core member,
a compressing step of winding a tape or film around an outer circumference of the laminate body and compressing the same,
a preheating step of heating and curing the laminate body so that a curing level of the thermosetting resin is 30 to 90% in a state prior to complete curing of the thermosetting resin; and
a main heating step of arranging the laminate body around which the tape or film is wound and the cylindrical core member in a molding die, heating the laminate body until the thermosetting resin is completely cured, and pressurizing the laminate body to deform the cylindrical core member to a non-circular cross-sectional shape, wherein a structural body in which the cylindrical core member and the laminate body are integrated is formed.

Further, the method for manufacturing a structural boy according to the present invention includes a first winding step of forming a cylindrical inner laminate body by winding a plurality of first composite materials including first reinforcing fibers and an uncured first thermosetting resin around a mandrel, a first compressing step of compressing a circumference of the inner laminate body, a first heating step of heating the inner laminate body until the first thermosetting resin is completely cured, a second winding step of forming a cylindrical outer laminate body by winding a plurality of second composite materials including second reinforcing fibers and an uncured second thermosetting resin around a circumference of the inner laminate body being cured, a second compressing step of compressing a circumference of the outer laminate body, a preheating step of heating the outer laminate body to a state prior to complete curing of the second thermosetting resin, an extracting step of extracting the mandrel from the outer laminate body and the inner laminate body, and a main heating step of placing the outer laminate body and the inner laminate body in a molding die, heating the outer laminate body until the second thermosetting resin is completely cured while pressurizing the outer laminate body to deform the outer laminate body.

Further, a structural body according to the present invention is a hollow structural body including an inner laminate body formed by curing a first thermosetting resin including first reinforcing fibers, and an outer laminate body formed by curing a second thermosetting resin including second reinforcing fibers, wherein the outer laminate body is formed in a manner protruding outward from an end portion of the inner laminate body, the inner laminate body inserted to an inner side of the outer laminate body is configured to retain a shape of the outer laminate body, an another member is inserted to an inner side of the inner laminate body, and a space is formed between the another member and the inner laminate body, and a part of an inner circumference of an end portion of the outer laminate body protruding outward from the end portion of the inner laminate body is closely adhered to an outer circumference of the another member.

Further, the structural body according to the present invention is a hollow structural body including an inner laminate body formed by curing a first thermosetting resin including first reinforcing fibers, and an outer laminate body formed by curing a second thermosetting resin including second reinforcing fibers, wherein the outer laminate body is formed in a manner protruding outward from an end portion of the inner laminate body, the inner laminate body inserted to an inner side of the outer laminate body is configured to retain a shape of the outer laminate body, and an another member is inserted to one end portion of the outer laminate body, and the other end portion of the outer laminate body is closed without having the another member inserted thereto.

Effects of the Invention

According to the present invention, it is possible to provide a method for manufacturing a structural body and a structural body made of FRP that offer high degree of freedom of cross-sectional shape despite being low cost.

DESCRIPTION OF EMBODIMENT(S)

Hereinafter, embodiments according to the present invention will be described with reference to the accompanying drawings.

It should be noted that, in the present specification, "reinforcing fibers" are preferably organic fibers represented by carbon fibers, glass fibers, or aramid fibers, silicon carbide fibers, metal fibers, or the like. In addition, it is preferable that "thermosetting resin" is an epoxy resins, a polyester resin, a vinyl ester resin, a phenol resin, a urethane resin, a polyimide resin, or the like, and epoxy resin, which is relatively popularly used, is more preferable.

A "laminate body", an "inner laminate body", and an "outer laminate body" can be formed by using a sheet winding method to wind a prepreg (composite material) sheet in which reinforcing fibers have been impregnated with a thermosetting resin and that has been heated or dried to a semi-cured state, or can be formed by using a tape winding method to wind a prepreg tape.

Alternatively, the laminate body can be formed by winding using a filament winding method in which a roving fiber is wound while being impregnated with resin. However, the sheet winding method and the tape winding method are more preferable because it is possible to use a stable prepreg in which the ratio of the resin and the reinforcing fiber are controlled.

As the prepreg, Torayca (Registered Trademark) manufactured by Toray Corporation can be suitably used, for example.

A "cylindrical core member" should preferably be made of a thin-walled metal (such as SUS) that is capable of plastic deformation while having a certain level of rigidity.

The material of a "mandrel" can be any of a metal, a resin, ceramic, or the like, but from the viewpoint of cost and durability, it is preferable to use metal. In addition, the shape of the mandrel is preferably a solid cylinder or a hollow cylinder, and may be a divisible shape instead of a single shape.

A "polygon" is preferably a rectangle or a polygonal shape with more corners.

In the present specification, a "tape or film" refers to a thin-walled member of any material. However, from the viewpoint of ease of use, it is preferable to use tape. The tape may be made of resin, metal, or any material, but it is preferable to use a resin having good workability. In addition, when a resin tape is used, any of polypropylene, polyethylene, polyester, cellophane, Teflon (Registered Trademark), or polyimide may be used, but due to its good balance of tape properties, polypropylene and polyester are preferably used.

First Embodiment

Figure 1:
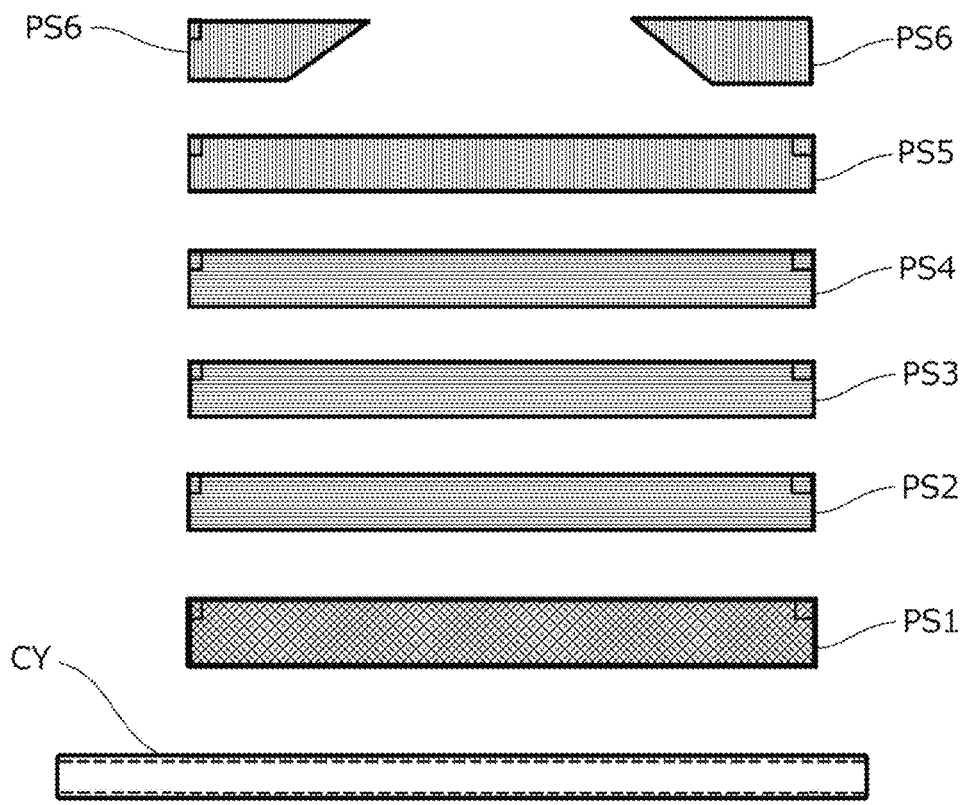
FIG. 1 is a diagram illustrating a winding step of a method for manufacturing a structural body according to a first embodiment, illustrating a prepreg and a cylindrical core member in a plan view.

A method for manufacturing a structural body according to a first embodiment will be described. FIG. 1 is a diagram schematically illustrating a winding step. As illustrated in FIG. 1, a cylindrical core member CY and various prepreg sheets PS1 through PS6 are prepared. The cylindrical core member CY is used as a mandrel for laminating and winding prepreg in the winding step, used as a jig for maintain the shape of the laminate body in a main heating step, and used as a reinforcing member integrated with the structural body after manufacture.

An outer diameter of the cylindrical core member CY is set to be slightly smaller with respect to an outer circumferential length of the structural body to be finally formed, in consideration of a thickness of the laminate body wound on an outer side. That is, it is desirable that the outer diameter in a state in which a plurality of prepreg sheets are wound around the cylindrical core member CY approximately matches a design value of the outer peripheral length of the structural body to be finally formed.

Regarding the prepreg sheets PS1 through PS6, sheets in which carbon fibers are impregnated with a raw material of an epoxy resin are used. In each prepreg sheet, the carbon fibers are oriented with regularity, and the solid lines in FIG. 1 illustrate the orientation direction of the carbon fibers. Hereinafter, the orientation direction of the carbon fibers is referred to according to a state in which the prepreg sheet is expanded.

(Winding Step)

A winding step of the present manufacturing method will be described. A prepreg sheet PS1 is a single prepreg sheet obtained by laminating a sheet in which an orientation direction of carbon fibers is +45 degrees with respect to an axis of the cylindrical core member CY and a sheet in which the direction is −45 degrees with respect thereto in two layers and bonding the layers together, and the prepreg sheet has an effect of resisting a torsional stress received by the structural body. The prepreg sheet PS1 is wound around the outer circumference of a cylindrical core member CY subjected to a releasing treatment on its outer circumference, as necessary.

In each of the prepreg sheets PS2, PS3, and PS4, the orientation directions of the carbon fibers are parallel to the axis of the cylindrical core member CY, which has a function of resisting tensile stresses received by the structural body. The prepreg sheets PS2, PS3 and PS4 are wound sequentially around the prepreg sheet PS1.

In the prepreg sheet PS5, the orientation directions of the carbon fibers are orthogonal to the axis of the cylindrical core member CY, which has a function of resisting expansion when the structural body is subjected to compressive stress. The prepreg sheet PS5 is wound around the prepreg sheet PS4.

A pair of prepreg sheets PS6 have a trapezoidal shape in which the orientation directions of the carbon fibers are orthogonal to the axis of the cylindrical core member CY. The prepreg sheet PS6 is wound around both ends of the prepreg sheet PS5.

In the present embodiment, the prepreg sheet PS6 on the outermost circumference is wound around both end portions only, so that a reinforcing effect is achieved. The number of prepreg sheets and the orientation direction of the carbon fibers can be changed arbitrarily in accordance with the desired mechanical strength of the structural body.

In this manner, a cylindrical laminate body LM (FIG. 2) is formed by winding a plurality of prepreg sheets on the cylindrical core member CY.

(Compressing Step)

Figure 2:
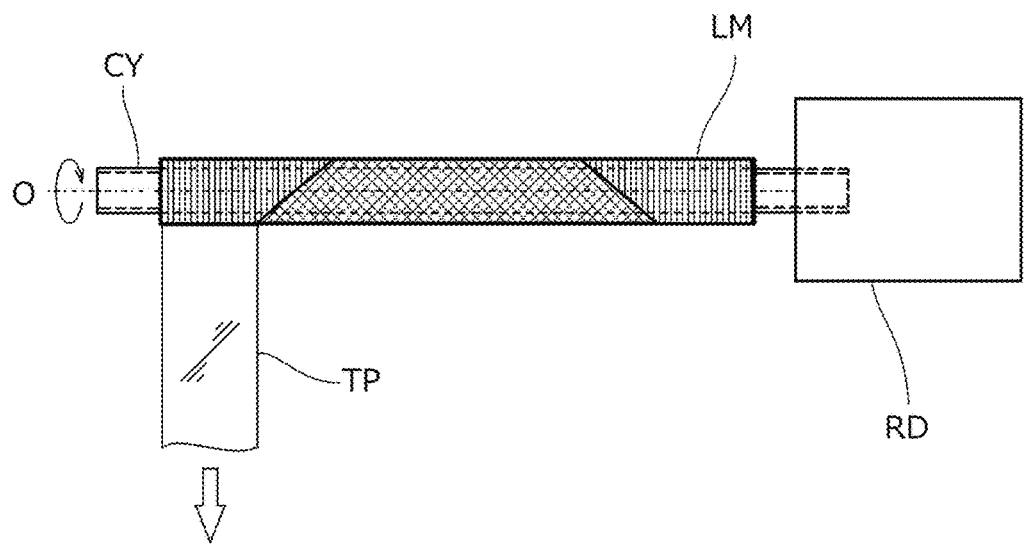
FIG. 2 is a diagram illustrating a compressing step of a method for manufacturing a structural body according to the first embodiment.

A compressing step of the present manufacturing method will be described. FIG. 2 is a diagram schematically illustrating the compressing step. In FIG. 2, one end of the cylindrical core member CY around which the laminate body LM is wound is connected to a rotary drive body RD such as a motor rotary shaft, and one end of a thin tape TP (here, chosen to be transparent) is attached to the outer circumference of the laminate body LM.

From such a state, the cylindrical core member CY is rotated together with the rotary drive body RD, and the tape TP is wound around the outer circumference of the laminate body LM while applying a predetermined tension. The predetermined tension varies depending on conditions such as the outer diameter of the laminate body LM, and preferably, it is in the range of 1 to 5 kgf. As a result, by compressing and pressurizing the laminated prepreg sheets PS1 through PS6, it is possible to eliminate gaps between the prepreg sheets and to increase the density of the laminate body LM.

Further, by moving the tape TP relatively along a direction of an axis O of the cylindrical core member CY, the tape TP is wound over the entire direction of the axis O of the laminate body LM to form a thin layer having an approximately uniform thickness.

However, the means for pressurizing the laminate body LM wound on the cylindrical core member CY is not limited to tape. For example, a tube made of a heat shrinkable film or the like may be disposed around the laminate body LM, and the heat shrinkable film may be shrunk by heating to compress the laminate body LM.

Alternatively, a rubber tape or a tube made of a rubber film (a rubber tube) may be disposed around the laminate body LM, and the laminate body LM can be compressed by its elastic force. As a result, the rotary drive body for rotating the cylindrical core member CY becomes unnecessary, and the cost of equipment is reduced.

(Preheating Step)

Figure 3:
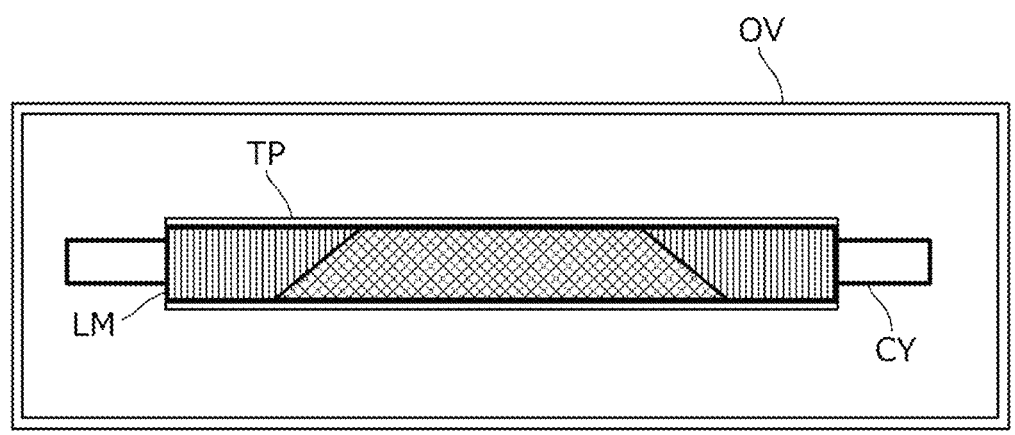
FIG. 3 is a diagram illustrating a preheating step of a method for manufacturing a structural body according to the first embodiment.

A preheating step of the present manufacturing method will be described. FIG. 3 is a diagram schematically illustrating the preheating step. A laminate body LM around which the tape TP is wound is placed in an oven OV together with the cylindrical core member CY. The laminate body LM is heated in the oven OV to a state prior to complete curing of the resin of the prepreg sheets of the laminate body LM. More specifically, the laminate body LM is heated such that the level of curing of the thermosetting resin of the laminate body LM is 30 to 90%.

Here, the level of curing of the thermosetting resin will be described. For example, when an uncured epoxy resin is heated at a rate of 5° C./min from room temperature to 200° C., and the heat flow (exothermic or endothermic) is measured using differential scanning calorimetry (DSC), it is found that a phenomenon peculiar to thermosetting resins occurs.

Figure 4:
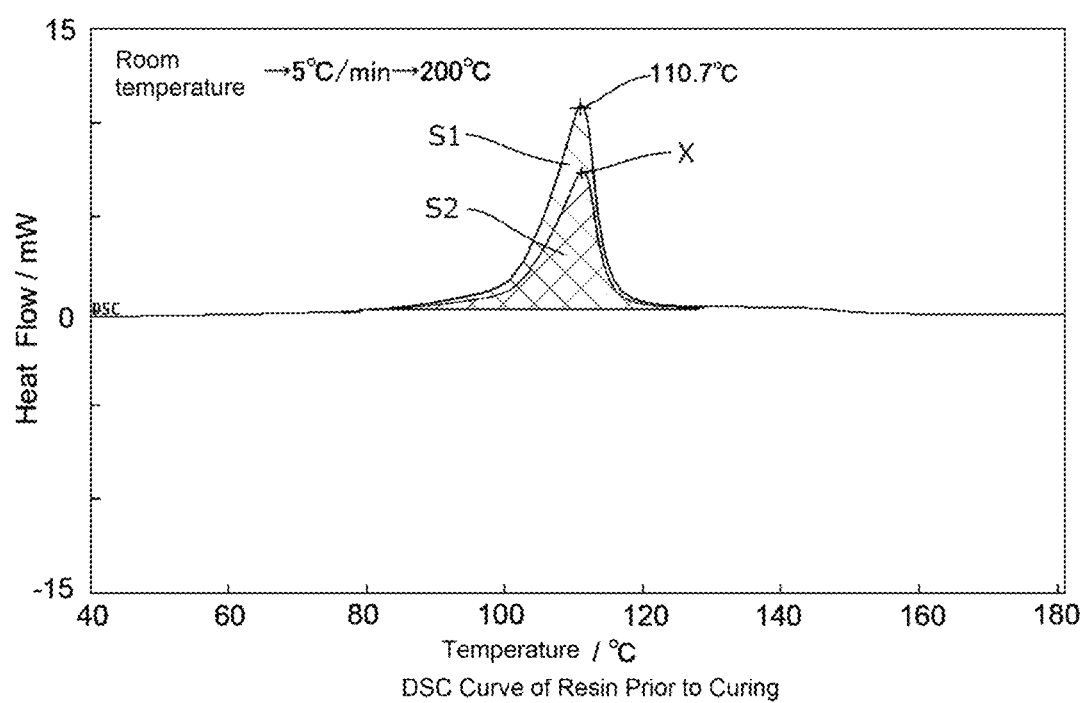
FIG. 4 is a diagram illustrating an example of a DSC curve for an uncured thermosetting resin, in which a vertical axis represents heat flow and a horizontal axis represents temperature.

Specifically, as in the DSC curve illustrated in FIG. 4, rapid heat generation occurs starting around 103° C., the peak in heat generation occurs at 110.7° C., and thereafter, the heat generation decreases rapidly. This heat generation represents that polymerization (curing) resulting from heating epoxy resin to an elevated temperature has occurred. Here, 110.7° C. is referred to as the maximum exothermic temperature of the epoxy resin.

Figure 5:
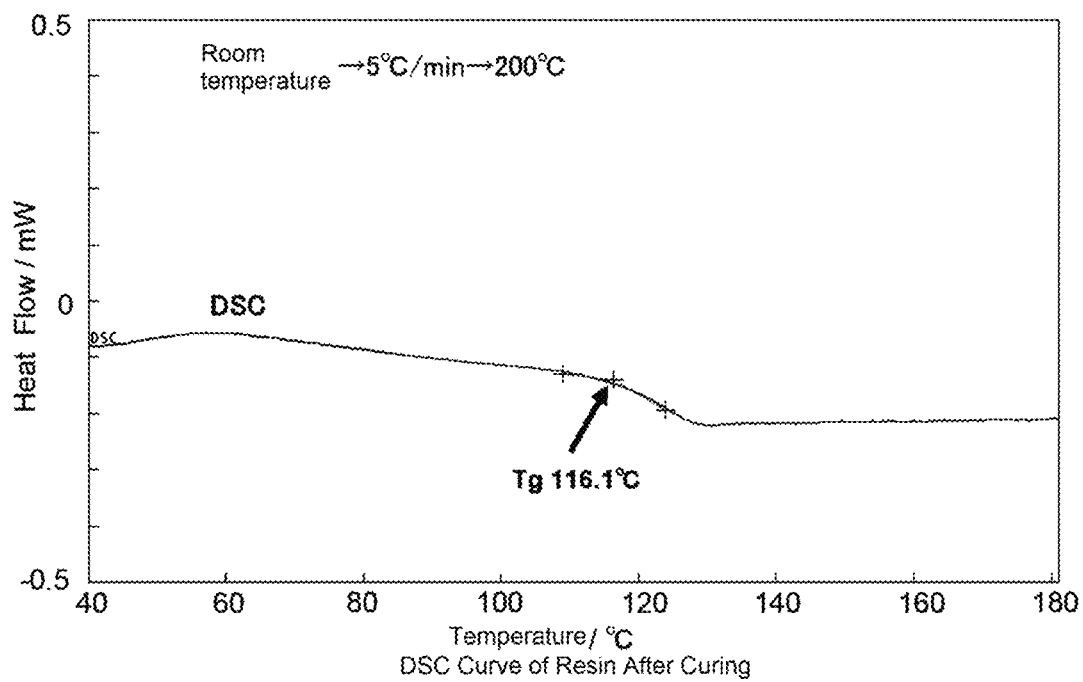
FIG. 5 is a diagram illustrating an example of a DSC curve for a completely cured thermosetting resin, in which the vertical axis represents heat flow and the horizontal axis represents temperature.

When the epoxy resin is cooled again to room temperature and then heated a second time to 200° C. at a rate of 5° C./min, as in the DSC curve illustrated in FIG. 5, the exothermic peak does not appear, and instead, an endothermic reaction occurs, and a glass transition is recognized to occur at 116.1° C. This is a phenomenon that occurs because the epoxy resin is already completely cured. ("Survey of Curing Temperature and Glass-Transition Temperature of Epoxy-Resins," MST Technical Document: No. C0220, Date of Publication: Oct. 20, 2011, Foundation: Material Foundation for Science and Technology)

On the other hand, if the heating is interrupted before the epoxy resin is completely cured, the exothermic peak becomes X° C., which is below 110.7° C. (FIG. 4). This indicates that there is a potential for further polymerization of the epoxy resin; that is, that the epoxy resin is in a state prior to complete curing.

In other words, when heating the thermosetting resin, by measuring the exothermic peak as necessary and interrupting the heating when the temperature reaches X° C., which is below the maximum exothermic temperature, it is possible to maintain the state prior to complete curing of the thermosetting resin.

In FIG. 4, when the area (referred to as the exothermic peak area) enclosed by the DSC curve at the time of complete curing and a baseline BS is set as S1, and the area enclosed by the DSC curve with an exothermic peak of X° C. and the baseline BS is set as S2, (S2/S1)×100% is defined as a level of curing of the thermosetting resin.

Taking advantage of the thermal characteristics of this thermosetting resin, the present inventors have found that the formability of the laminate body LM is improved by interrupting the heating of the laminate body LM at a curing level of 30 to 90%, for example, before the thermosetting resin is completely cured. The exothermic peak X° C. corresponding to the curing level of 30 to 90% can be obtained by experiments or by simulation. The effect of improving the formability of the laminate body LM will be described later in connection with a main heating step.

(Cutting Step)

Figure 6:
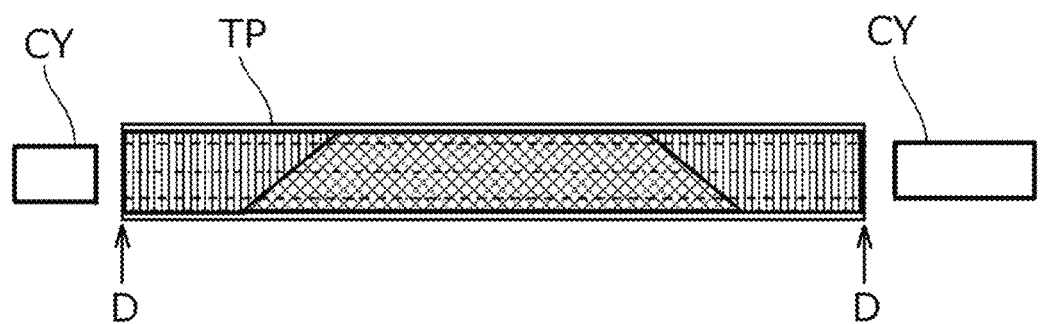
FIG. 6 is a diagram illustrating a cutting step of a method for manufacturing a structural body according to the first embodiment, illustrating a state where an end portion of a cylindrical core member is cut.

A cutting step of the present manufacturing method will be described. FIG. 6 is a diagram schematically illustrating the cutting step. The laminate body LM on which the tape TP is wound is taken out of the oven OV, and both ends of the cylindrical core member CY are cut at end positions (D) of the laminate body LM, as illustrated in FIG. 6. A member including the laminate body LM heated to a state prior to complete curing and the cylindrical core member is referred to as a preform body. Incidentally, it is possible to leave the cylindrical core member CY without cutting the same, which can be used for fitting connection with another component or for screw connection by forming screw threads.

The unheated laminate body needs to be stored in a refrigerator or a freezer in order to prevent degradation of the resin material. On the other hand, the level of curing of the resin material has been controlled regarding the laminated body LM in the preform body being formed, and there is almost no deterioration of the resin material even when stored at room temperature. Accordingly, by mass-producing preform bodies and storing them, it becomes possible to supply the product in response to sudden demands.

In addition, since a plurality of types of structural bodies can be formed from one type of preform body, manufacturing costs can be reduced.

(Main Heating Step)

Figure 7:
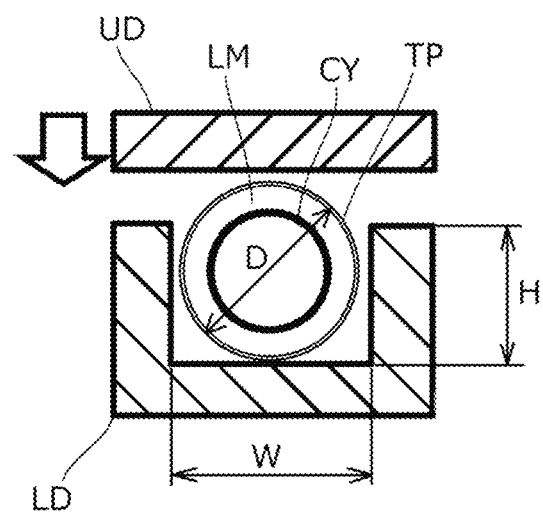
FIG. 7 is a diagram illustrating a part of a main heating step of the method for manufacturing a structural body according to the first embodiment, illustrating a state prior to mold clamping as viewed in an axial direction of a laminate body.
Figure 8:
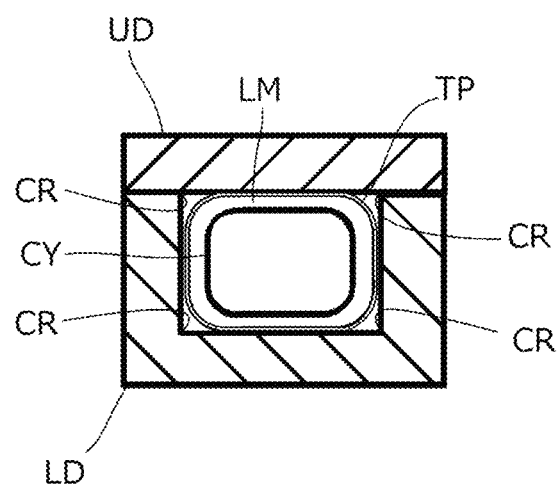
FIG. 8 is a cross-sectional diagram illustrating a part of the main heating step of the method for manufacturing a structural body according to the first embodiment, illustrating a state where the mold is clamped and heated.

A main heating step of the present manufacturing method will be described. FIGS. 7 and 8 are diagrams schematically illustrating the main heating step. First, as illustrated in FIG. 7, the laminate body LM having its inner circumference supported by the cylindrical core member CY is disposed between a plate-shaped upper mold UD and a trough-shaped lower mold LD. The upper mold UD and the lower mold LD constitute a molding die.

Here, when a width of a trough bottom surface in the lower mold LD is set to W, a height of a trough inner wall is set to H, and an outer diameter of the laminate body LM wound with tape TP is set to D, if $\pi D \approx 2(W+H)$, the inner circumferential length of the mold and the outer circumferential length of the final structural body can be made approximately equal to each other, whereby a structural body having a consistent shape can be obtained.

Thereafter, as illustrated in FIG. 8, the upper mold UD and the lower mold LD are brought relatively close to each other, and mold clamping is performed. Thereby, the cylindrical core member CY is plastically deformed (partially elastically deformed) to a rectangular cylinder shape. At the same time, since the thermosetting resin of the laminate body LM has been heated to a level of curing of 90% or less in the previous preheating step, the laminate body LM can be deformed so as to conform to the inner wall shape formed by the upper mold UD and the lower mold LD.

In this case, since the cylindrical core member CY has a certain level of rigidity, it is possible to maintain the deformed state of the laminated body LM so as to conform to the mold, and the laminated body LM can be suppressed from collapsing, by resisting the pressurizing force from the molding die.

Furthermore, by heating the inside of the upper mold UD and the lower mold LD using a heater not shown, the laminate body LM can be completely cured. The cylindrical ore material CY can be maintained to its deformed rectangular cylinder shape by the cured laminated body LM.

According to the present invention, since a tape TP with a high slidability is wound around the circumference of the laminate body LM with predetermined tension, even in a case in which a relative displacement occurs between the outer surface of the laminate body LM and the inner wall surface of the molding die along with the upper mold UD and the lower mold LD being pressurized, sliding can occur between the two with almost no resistance. As a result, the mold compatibility of the laminate body LM is improved, and a stable product shape can be obtained. Therefore, it is possible to prevent local lowering of pressure by resistance due to the tape TP and to effectively suppress defects such as wrinkles, voids, and resin rich of the laminate body LM, which often occur particularly in the vicinity of the corner portion CR, so that a stable product quality can be achieved.

On the other hand, by improving the mold compatibility of the laminate body LM, since it is possible to reduce the pressure of the molding die while reducing the strength and rigidity of the mold, the degree of freedom in selection of a usable mold material can be expanded. In addition, since the equipment for driving the molding die can be simplified, a reduction in equipment cost can be achieved.

In addition, due to a shape retaining function of the tape TP, an intersection portion of a side surface (first surface) and an upper and lower surfaces (second surface with a normal line having a direction that is different from the first surface) of the laminate body LM formed by being strongly pressed against the right angle corner CR has a curved surface with a curvature that is constant or that gradually changes (that is, no edge is formed at the intersection portion). In addition, since the reinforcing fibers at the intersection portion bend without being broken (i.e., the continuity of the fibers is maintained), the strength of the structural body can be ensured.

(Releasing Step)

Figure 9:
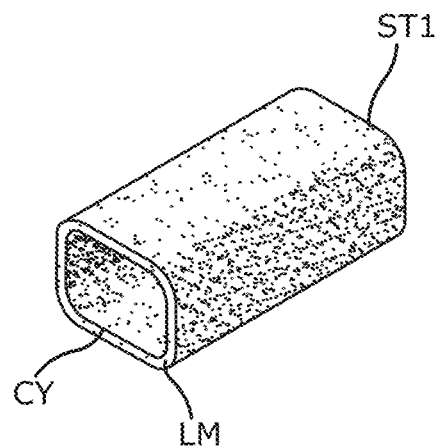
FIG. 9 is a perspective view of the structural body manufactured by the manufacturing method according to the first embodiment.

Thereafter, the heating is interrupted, the upper mold UD and the lower mold LD are separated from each other, and the tapes TP are peeled off from the laminate body LM having been deformed to the rectangular cylinder shape, a structural body (polygonal structural body) ST1 illustrated in part in FIG. 9 having a rectangular cross-sectional shape is completed. The structural body ST1 is formed by closely adhering the laminate body LM to the outer circumference of the cylindrical core member CY whose cross-sectional shape is deformed into a rectangle and integrating them, so that a hybrid structure having both the property of metal which is resistant to bending and the property of FRP which is light weight and has high strength is obtained. Therefore, for example, the structural body ST1 can be utilized as an impact absorbing structure of a vehicle and the like. Further, the structural body ST1 can be coupled with other components such as metal, according to which the purpose of use of the body can be expanded.

Modified Example

Figure 10:
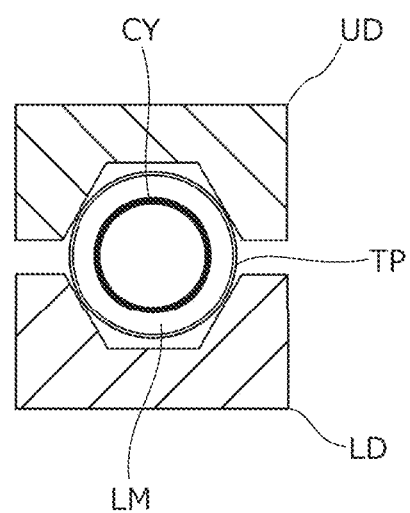
FIG. 10 is a diagram illustrating a part of the main heating step of the method for manufacturing a structural body according to a modified example, illustrating a state prior to mold clamping as viewed in the axial direction of the laminate body.

FIG. 10 is a view similar to FIG. 7, illustrating a main heating step of the manufacturing method according to a modified example. In the present modified example, the upper mold UD and the lower mold LD have the same shape, and specifically, they have opposing transfer surfaces of trapezoidal shapes, so that when the mold is clamped, a hexagonal shape is formed by the pair of transfer surfaces. In the present modified example, similar to the embodiment described above, the laminate body LM is wound around the outer circumference of the cylindrical core member CY, and a preform body having a TP wound therearound is used as the outer circumference.

As illustrated in FIG. 10, the preform body is arranged between the upper mold UD and the lower mold LD, and mold clamping is performed with the upper mold UD relatively approximated to the lower mold LD. Since the thermosetting resin of the laminate body LM is heated to a curing level of 90% or lower in the preheating step, the laminated body LM can be deformed into a hexagonal shape so as to conform to the inner wall shape formed by the upper mold UD and the lower mold LD. Further, a heater not shown can be used to heat the inside of the upper mold UD and the lower mold LD to perform complete curing of the laminate body LM.

Figure 11:
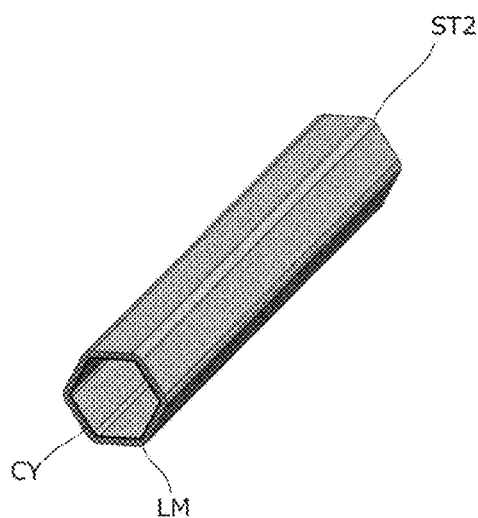
FIG. 11 is a perspective view of the structural body manufactured by the manufacturing method according to a modified example of the first embodiment.

Thereafter, by separating the upper mold UD and the lower mold LD, a structural body (polygonal structural body) ST2 having a hexagonal cross-sectional shape illustrated in FIG. 11 can be taken out. The structural body ST2 has the laminate body LM formed on the outer circumference of the cylindrical core member CY which is deformed to have a hexagonal cross-sectional shape. For example, by arranging structural bodies ST2 adjacently with parallel axes without gaps formed therebetween, a honeycomb-shaped shock absorbing body having almost no space formed between adjacent structural bodies ST2 can be formed.

Incidentally, a first laminate body LM1 formed via a first winding step, a first compressing step, and a first heating step according to a second embodiment described later can be used as the cylindrical core member CY. Further, the pressurized deformation by the molding die can be performed to a part of the preform body in the longitudinal direction, by which a structural body having a modified cross-section can be formed.

Second Embodiment

Figure 12:
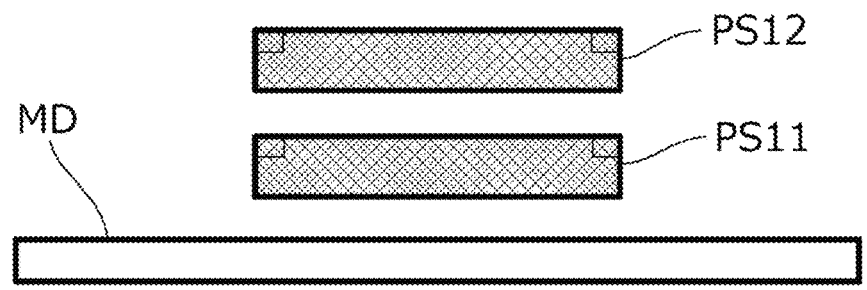
FIG. 12 is a diagram schematically illustrating a first winding step of a method for manufacturing a structural body according to a second embodiment.

Next, a manufacturing method according to a second embodiment will be described. FIG. 12 is a diagram schematically illustrating a first winding step. As illustrated in FIG. 12, a mandrel (core bar) MD having a circular cross-section, and prepreg sheets (composite materials) PS11 and PS12 which are formed by impregnating first reinforcing fibers with a first thermosetting resin, then heating and drying the same to a semi-cured state are prepared.

Similar to the cylindrical core member CY, an outer diameter somewhat smaller than the outer diameter of the product is set as the outer diameter of the mandrel MD. Further, the total length of the mandrel MD is longer than the product length of the structural body.

(First Winding Step)

A releasing treatment is performed as needed to the outer circumference of the mandrel MD, and the prepreg sheets PS11 and PS12 are wound around the mandrel MD. The winding method described above can be adopted as the winding method. The first reinforcing fibers and the first thermosetting resin can be selected arbitrarily from among the above-mentioned reinforcing fibers and thermosetting resins.

The orientation directions of the fibers of the prepreg sheets PS11 and PS12 are preferably inclined within a range between 15 degrees and 90 degrees with respect to the axis of the mandrel MD. Thereby, when the preform body is formed, strength to resist the pressure applied during clamping of the mold can be ensured.

As described, a cylindrical first laminate body (inner laminate body) LM1 (FIG. 13) realized by winding prepreg sheets PS11 and PS12 around the mandrel MD is formed. Further, three or more prepreg sheets can be wound around the mandrel MD. Further, the following steps can be performed by inserting a hollow cylindrical member instead of the first laminate body to the mandrel MD.

(First Compressing Step)

Figure 13:
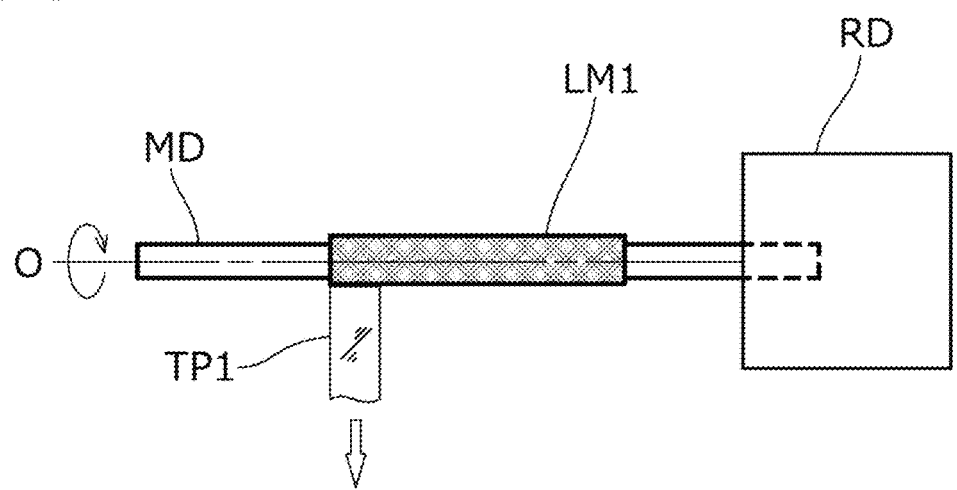
FIG. 13 is a diagram schematically illustrating a first compressing step of the method for manufacturing a structural body according to the second embodiment, illustrating a prepreg and a mandrel in a plan view.

A first compressing step of the present manufacturing method will be explained. FIG. 13 is a diagram schematically illustrating the first compressing step. In FIG. 13, one end of the mandrel MD around which a first laminate body LM1 is wound, is connected to a rotary drive body RD such as a motor rotating shaft, and one end of a thin first tape TP1 (which can be a film) is adhered to the outer circumference of the first laminate body LM1.

From this state, the mandrel MD is rotated together with the rotary drive body RD, and the first tape TP1 is wound around the outer circumference of the first laminate body LM1 with a predetermined tension applied thereto. The predetermined tension varies according to conditions such as the outer diameter of the first laminate body LM1, but preferably, it falls within the range of 1 to 5 kgf. Prepreg sheets PS11 and PS12 laminated in this manner are compressed and pressurized, by which the density of the first laminate body LM1 can be increased while eliminating gaps formed between the prepreg sheets.

Moreover, by relatively moving the first tape TP1 along the direction of the axis O of the mandrel MD, the first tape TP1 can be wound across the whole area of the first laminate body LM1 in the direction of the axis O, and a thin layer having an approximately uniform thickness is formed.

The means for pressurizing the first laminate body LM1 wound around the mandrel MD is not limited to the first tape. For example, a tube formed of a heat shrinkable film may be arranged around the first laminate body LM1, and the heat shrinkable film can be shrunk by heating to compress the first laminate body LM1.

Alternatively, a rubber tape, or a rubber film formed into a tube (rubber tube), can be arranged around the first laminate body LM1, compressing the first laminate body LM1 by its elastic force. Thereby, a rotary drive body for rotating the mandrel MD will no longer be necessary, and equipment costs can be cut down.

(First Heating Step)

The first laminate body LM1 having the first tape TP1 wound therearound is arranged together with the mandrel MD in an oven not shown and heated for two hours with the oven temperature set to 135° C., for example. Thereby, the first laminate body LM1 is completely cured.

Thereafter, the first laminate body LM1 is taken out together with the mandrel MD from the oven, and the first tape TP1 wound around the outer circumference thereof is peeled off. Then, a roughing processing is performed by grinding or the like to the surface of the outer circumference of the first laminate body LM1, by which a minute uneven microstructure is formed. Alternatively, a minute unevenness can be formed on the surface by winding a thin fabric sheet (peel ply) on the outermost layer after having wound the prepreg sheet PS12 in the first winding step and peeling the peel ply after removing the first tape TP1 after the first heating step. Further, an adhesive sheet can be wound around the outer circumference of the first laminate body LM1. Thereby, the adhesion of the first laminate body LM1 and a second laminate body LM2 described later can be enhanced.

(Second Winding Step)

Figure 14:
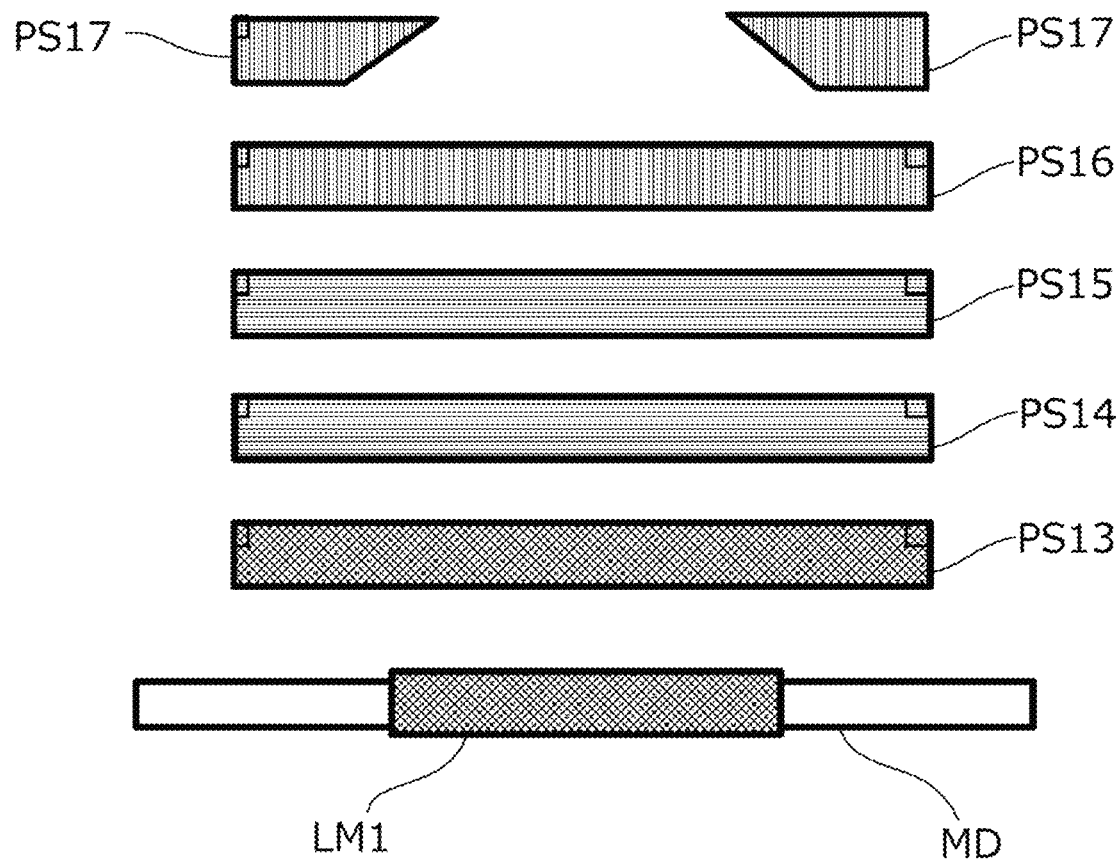
FIG. 14 is a diagram schematically illustrating a second winding step of the method for manufacturing a structural body according to the second embodiment.

Next, a second winding step of the present manufacturing method will be described. FIG. 14 is a diagram schematically illustrating the second winding step. Prepreg sheets PS13 through PS17 are a composite material having second reinforcing fibers impregnated with second thermosetting resin, which are heated or dried to a semi-cured state. The second reinforcing fibers and the second thermosetting resin can be selected arbitrarily from the reinforcing fibers and thermosetting resins described earlier. The second reinforcing fibers can be the same as or different from the first reinforcing fibers. Further, the second thermosetting resin can be the same as or different from the first thermosetting resin. Moreover, the outer laminate body may only be wound around at least a portion of the inner laminate body.

The prepreg sheet PS13 is a single prepreg sheet obtained by laminating a sheet in which an orientation direction of fibers is +45 degrees with respect to an axis of the mandrel MD and a sheet in which the direction is −45 degrees with respect thereto in two layers and bonding the two layers together, and the structural body has an effect of resisting a torsional stress received by the structural body. The prepreg sheet PS13 is wound around the outer circumference of the mandrel MD so that they protrude from both ends of the first laminate body LM1 in the longitudinal direction. The winding method described earlier can be adopted as the winding method. The same applies to the following description.

The prepreg sheets PS14 and PS15 respectively have orientation directions of fibers arranged in parallel with the axis of the mandrel MD, and the sheets have an effect of resisting a tensile stress received by the structural body. The prepreg sheets PS14 and PS15 are sequentially wound around the prepreg sheets PS13 having the same length.

The prepreg sheet PS16 has orientation directions of fibers arranged orthogonal to the axis of the mandrel MD, and the structural body has an effect of resisting expansion when the structural body receives compressive stress. The prepreg sheet PS16 is wound around the prepreg sheet PS15 having the same length.

The pair of prepreg sheets PS17 has orientation directions of fibers arranged orthogonal to the axis of the mandrel MD, and the sheets have a trapezoidal shape. The prepreg sheets PS17 are wound around both ends of the prepreg sheet PS16.

According to the present embodiment, the prepreg sheets PS17 arranged on the outermost circumference are wound only around both end portions, according to which a reinforcing effect is expected. The number of prepreg sheets and the orientation directions of the fibers can be changed arbitrarily according to the desired mechanical strength of the structural body.

Thus, a cylindrical second laminate body (outer laminate body) LM2 is formed by winding a plurality of prepreg sheets around the first laminate body LM1. It is preferable for the first laminate body LM1 and the second laminate body LM2 to be joined so that the outer diameter is gradually varied such that level differences is not formed along the longitudinal direction.

(Second Compressing Step)

A second tape TP2 (or a film) is wound around the outer circumference of the second laminate body LM2 formed on the mandrel MD in a manner similar to the compressing step of the first embodiment. Other compressing means as described above can be used instead of the second tape.

(Preheating Step)

The mandrel MD having the second tape TP2 wound around the outer circumference of the second laminate body LM2 is arranged in an oven not shown, and heated in a similar manner as the preheating step of the first embodiment to a state prior to complete curing of the resin of the prepreg sheet of the second laminate body LM2, that is, heated so that a curing level of 30 to 90% of the thermosetting resin of the second laminate body LM2 is obtained.

(Extracting Step)

Thereafter, the mandrel MD is taken out from the oven and extracted from the first laminate body LM1 and the second laminate body LM2. In this state, the second laminate body LM2 is supported by the first laminate body LM1 that has already been thermally cured, and the second tape TP2 is wound around the outer circumference of the second laminate body LM2, so that a cylindrical shape can be maintained even if the mandrel MD is extracted. Th member including the completely cured first laminate body LM1 and the second laminate body LM2 that has been heated to a state prior to complete curing is referred to as a preform body. The preform body having increased the density by winding the second laminate body LM2 around the mandrel MD can be manufactured by a relatively simple equipment with a stable quality.

Even if the first laminate body LM1 is in a completely heated state, if the second laminate body LM2 is not heated, it is necessary to store the member in a refrigerator or a freezer to prevent degradation of the resin material thereof. Meanwhile, as for the formed preform body, the first laminate body LM1 is stable and the second laminate body LM2 has a controlled curing level of resin material, so that the resin material will not easily degrade even when stored at room temperature. Therefore, by producing the preform bodies in large quantities and storing them, supply of the products even in response to a sudden demand is enabled.

Further, multiple varieties of structural bodies (refer to FIGS. 17, 19, 21, and 23 described later) can be formed from one type of preform body, so that the production costs can be cut down.

(Main Heating Step)

Figure 15:
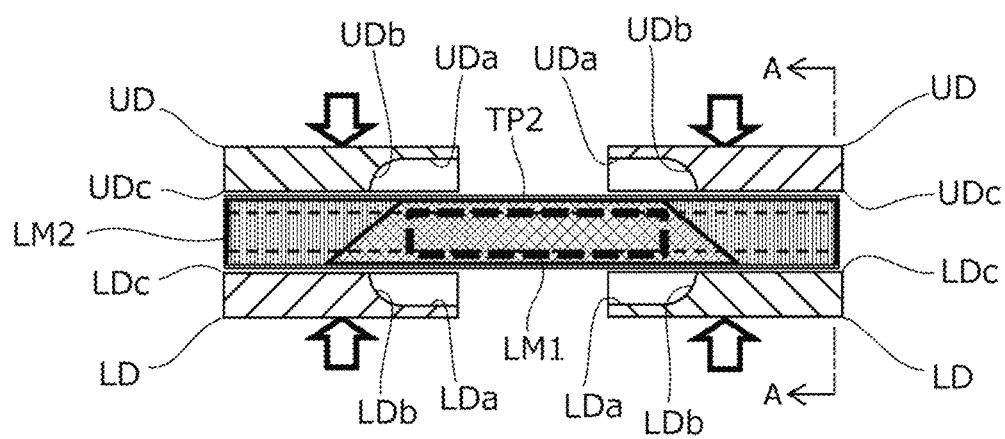
FIG. 15 is diagram schematically illustrating a main heating step of the method for manufacturing a structural body according to the second embodiment.
Figure 16:
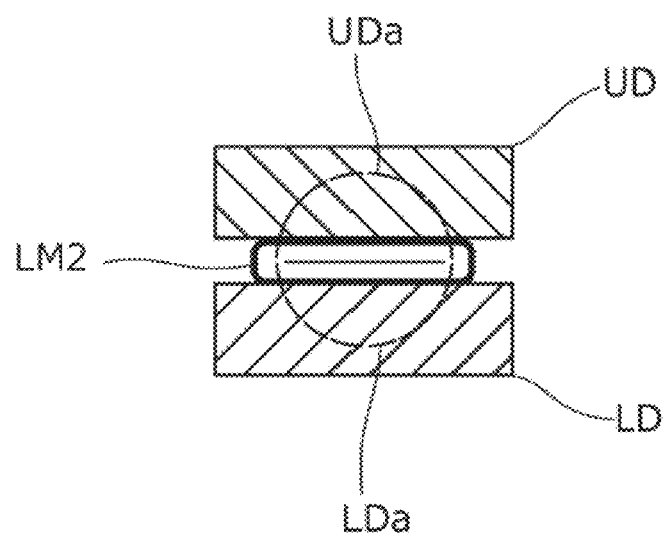
FIG. 16 is a diagram illustrating a state of the configuration of FIG. 15 during mold clamping as viewed in the arrow direction at the A-A cross-section.

A main heating step of the present manufacturing method will be described. FIG. 15 is a diagram schematically illustrating the main heating step. FIG. 16 is a view illustrating a state in which a configuration of FIG. 15 is viewed in the arrow direction at an A-A cross-section.

At first, as illustrated in FIG. 15, a pair of upper molds UD and lower molds LD are arranged so as to sandwich both ends of the preform body composed of the first laminate body LM1 and the second laminate body LM2. The upper molds UD and the lower molds LD constitute a molding die.

The upper molds UD and the lower molds LD have common shapes. Specifically, the block-shaped upper mold UD includes a flat surface UDc, a half-cylinder-shaped recessed surface UDa having approximately a same diameter as the second laminate body LM2, and a transition surface UDb having a concave surface shape that connects the flat surface UDc and the recessed surface UDa. Further, the block-shaped lower mold LD includes a flat surface LDc, a half-cylinder-shaped recessed surface LDa having approximately the same diameter as the second laminate body LM2, and a transition surface LDb having a concave shape that connects the flat surface LDc and the recessed surface LDa.

As illustrated in FIG. 15, the recessed surfaces UDa and LDa are positioned on an outer side in a radial direction at the end portions of the first laminate body LM1, the flat surfaces UDc and LDc are positioned on the outer side in the radial direction at the end portions of the second laminate body LM2, and the preform body is arranged between the upper molds UD and the lower molds LD.

In this state, when the upper molds UD and the lower molds LD are relatively approximated to perform mold clamping, the flat surfaces UDc and LDc will sandwich the end portions of the preform body. Since the thermosetting resin of the second laminate body LM2 is heated to a curing level of 90% or less in the previous preheating step, the flat surfaces UDc and LDc can easily deform the second laminate body LM2 in a flat pressed manner (refer to FIG. 16).

In this state, since the second tape TP2 is wound around the circumference of the second laminate body LM2 with a predetermined tension, and due to the shape retaining function of the second tape TP2, even if the second laminate body LM2 is pressed flat to a plate shape, an outer surface at both edges (left and right sides of FIG. 16) of the end portions of the second laminate body LM2 is formed to have a curved surface with a constant or gradually changing curvature. Thereby, the quality of appearance of the structural body and strength thereof against bending and twisting is improved. Further, since the reinforcing fibers that pass both edges are bent without being folded (i.e., the continuity of the fibers is maintained), an even higher strength is ensured. However, depending on the cross-sectional shape of the structural body, the use of the second tape TP2 is not always necessary.

Meanwhile, a center portion of the second laminate body LM2 is maintained to a cylindrical shape resisting the pressurizing force of the molding die by the cured first laminate body LM1. Specifically, the pressurizing force is not directly applied to the second laminated body LM2 at the outer circumference of the first laminate body LM1 since the recessed surfaces UDa and LDa are provided, so that a highly accurate cylindrical shape can be maintained.

Furthermore, by heating the upper mold UD, the lower mold LD, and the entire second laminate body LM2 using a heater or an oven not shown, the second laminate body LM2 can be completely cured in the deformed state.

Figure 17:
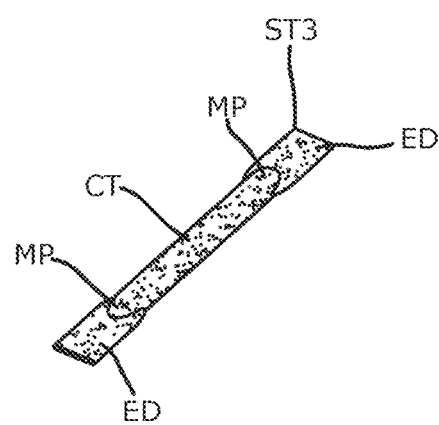
FIG. 17 is a perspective view of a structural body of a modified cross-sectional shape manufactured by the manufacturing method according to the second embodiment.

Thereafter, the upper mold UD and the lower mold LD are separated and the second tape TP2 is peeled off, by which a structural body (modified cross-section structural body) ST3 having a modified cross-sectional shape as illustrated in FIG. 17 is obtained. The structural body ST3 includes a hollow cylinder-shaped center portion CT, and closed flat plate-shaped end portions ED. Intermediate surfaces MP connecting the center portion CT and the end portions ED are each pressurized from upper and lower directions by the transition surfaces UDb and LDb and are each formed into partially spherical shapes. By providing the intermediate surfaces MP, sudden change of shape between the center portion CT and the end portions ED can be prevented, and concentration of stress can be suppressed.

For example, by forming bolt holes to the end portions ED, the structural body ST3 can be engaged with other components by bolts using the bolt holes. In the example, both end portions ED of the structural body ST3 are designed to correspond to a horizontal plane. However, by changing the mold clamping direction of the molding die, the structural body ST3 can be designed so that when one end portion ED corresponds to the horizontal plane, the other end portion ED corresponds to a vertical plane. Moreover, each end portion ED can be formed sequentially by using only one pair of upper mold UD and lower mold LD. Thereby, the equipment cost can be reduced significantly.

First Modified Example

Figure 18:
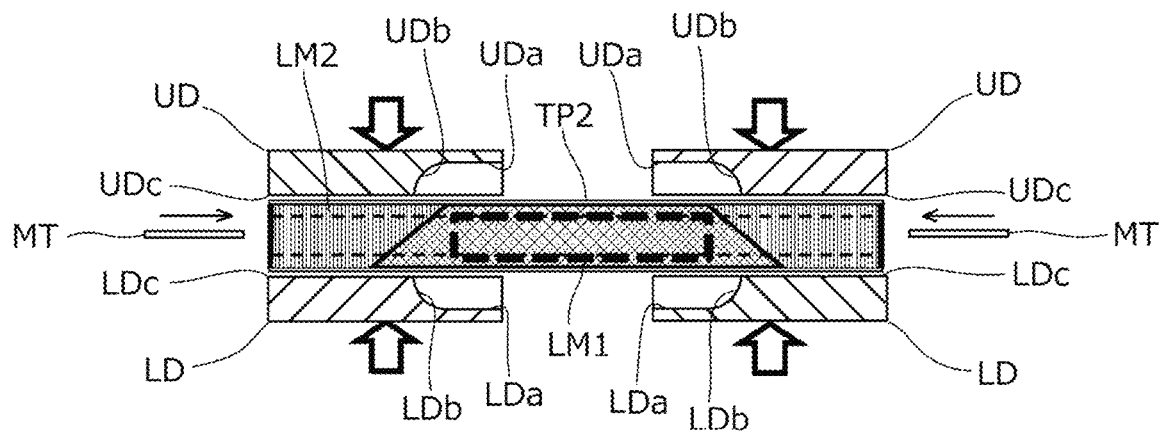
FIG. 18 is a view similar to FIG. 15, illustrating a main heating step of a manufacturing method according to a first modified example of the second embodiment.

FIG. 18 is a view similar to FIG. 15, illustrating a main heating step of a manufacturing method according to a first modified example. In the present modified example, pressurizing and heating of the preform body using upper molds UL and lower molds LD are performed similarly as the second embodiment, but prior to pressurizing, metallic plate members MT are inserted to both ends of the second laminate body LM2. Through mold clamping of the upper molds UD and the lower molds LD performed thereafter, the plate members MT are pressure-bonded by upper and lower parts at the end portions of the second laminate body LM2, and the second laminate body LM2 is thermally cured while maintaining that state.

Figure 19:
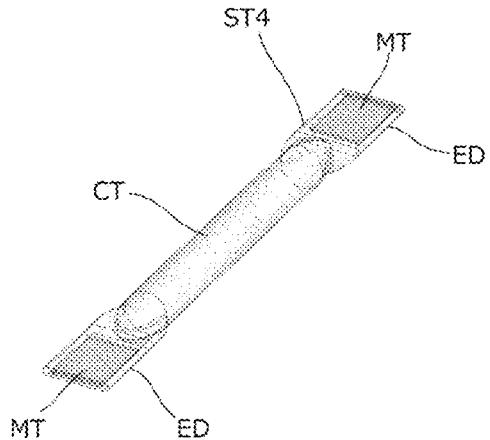
FIG. 19 is a perspective view of a structural body of a modified cross-sectional shape manufactured by the manufacturing method according to the first modified example, illustrating a state where an internal structure is visualized.

According to the first modified example, by heating and pressurizing the upper molds UD and lower molds LD, a structural body (modified cross-section structural body) ST4 having a modified cross-sectional shape as illustrated in FIG. 19 is manufactured. The structural body ST4 includes a hollow cylinder-shaped center portion CT and end portions ED to which plate members MT are inserted. Therefore, the structural body will not easily break even when bolt holes are formed on the end portions ED, and the functions as a structural body are further enhanced. The parts inserted to the end portions of the second laminate body LM2 are not limited to metal parts. For example, by inserting rubber or resin, the interior of the center portion CT of the structural body ST4 can be sealed, and inflow of gas or fluid from the exterior can be prevented.

Second Modified Example

Figure 20:
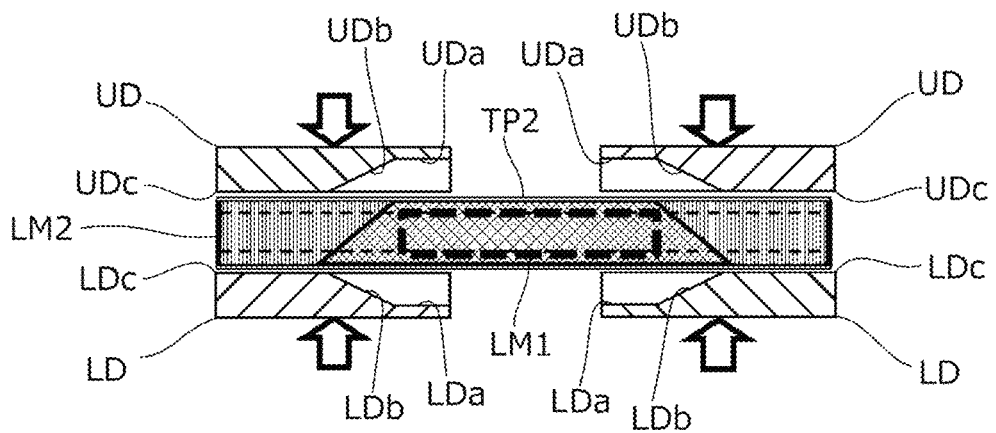
FIG. 20 is a view similar to FIG. 15, illustrating a main heating step of a manufacturing method according to a second modified example of the second embodiment.

FIG. 20 is a diagram similar to FIG. 15, illustrating a main heating step of a manufacturing method according to a second modified example. According to the present modified example, upper molds UD and lower molds LD that have a different shape as those according to the second embodiment are used. Specifically, a block-shaped upper mold UD includes a flat surface UDc, a half-cylinder-shaped recessed surface UDa having approximately a same diameter as the second laminate body LM2, and a transition surface UDb having a planar shape that connects the flat surface UDc and the recessed surface UDa. Further, a block-shaped lower mold LD includes a flat surface LDc, a half-cylinder-shaped recessed surface LDa having approximately the same diameter as the second laminate body LM2, and a transition surface LDb having a planar shape that connects the flat surface LDc and the recessed surface LDa. The other configurations are similar to the embodiment described above.

Figure 21:
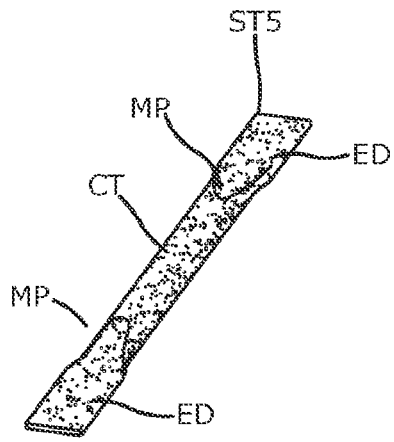
FIG. 21 is a perspective view of a structural body of a modified cross-sectional shape manufactured by the manufacturing method according to the second modified example.

According to the second modified example, a structural body (modified cross-section structural body) ST5 having a modified cross-sectional shape illustrated in FIG. 21 is manufactured by heating and pressurizing the upper molds UD and the lower molds LD. The structural body ST5 includes a hollow cylinder-shaped center portion CT, closed flat plate-shaped end portions ED, and intermediate surfaces MP that connect the center portion CT and the end portions ED. The intermediate surfaces MP are pressurized from upper and lower directions by transition surfaces UDb and LDb and are each formed into a planar shape.

Third Modified Example

Figure 22:
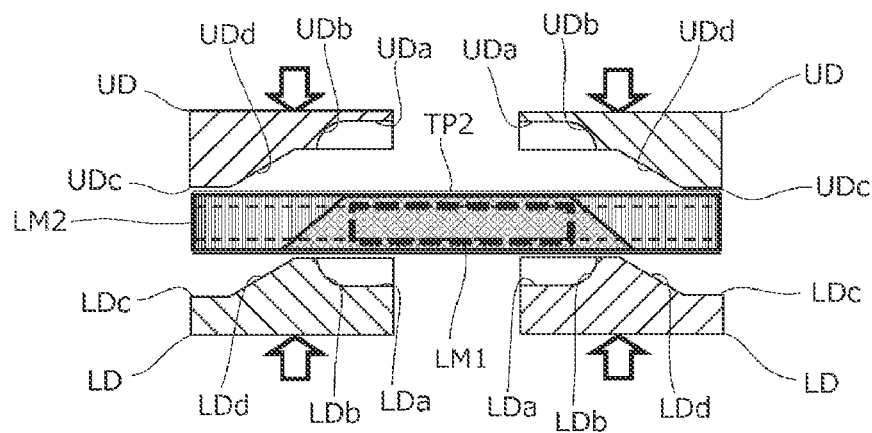
FIG. 22 is a view similar to FIG. 15, illustrating a main heating step of a manufacturing method according to a third modified example of the second embodiment.

FIG. 22 is a diagram similar to FIG. 15, illustrating a main heating step of a manufacturing method according to a third modified example. According to the present modified example, upper molds UD and lower molds LD that have a different shape as those according to the second embodiment are used. Specifically, a block-shaped upper mold UD includes a flat surface UDc, a half-cylinder-shaped recessed surface UDa shifted upward with respect to the flat surface UDc, a transition surface UDb having a concave shape that connects to the recessed surface UDa, and an inclined surface UDd formed between the transition surface UDb and the flat surface UDc. A block-shaped lower mold LD includes a flat surface LDc, a half-cylinder-shaped recessed surface LDa shifted upward with respect to the flat surface LDc, a transition surface LDb having a concave shape that connects to the recessed surface LDa, and an inclined surface LDd formed between the transition surface LDb and the flat surface LDc. The inclined surfaces UDd and LDd become parallel during mold clamping. The other configurations are similar to the embodiment described above.

Figure 23:
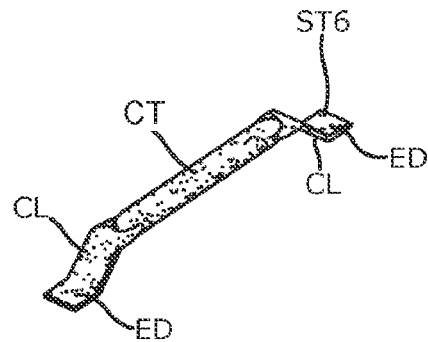
FIG. 23 is a perspective view of a structural body of a modified cross-sectional shape manufactured by the manufacturing method according to the third modified example.

According to the third modified example, a structural body (modified cross-section structural body) ST6 having a modified cross-sectional shape illustrated in FIG. 23 is manufactured by heating and pressurizing the upper molds UD and the lower molds LD. The structural body ST6 includes a hollow cylinder-shaped center portion CT, closed flat plate-shaped end portions ED, and inclined plate portions CL formed between the center portion CT and the end portions ED. The inclined plate portions CL are each pressured by the inclined surfaces UDd and LDd and formed into an inclined plate shape. The structural body ST6 has a shape in which the center portion CT is shifted upward with respect to the end portions ED since the inclined plate portions CL are formed, according to which interference of the structural body ST6 with surrounding parts can be prevented. It is also possible to provide an arbitrary curvature to the cross-sectional shape of the center portion CT.

Fourth Modified Example

Figure 24:
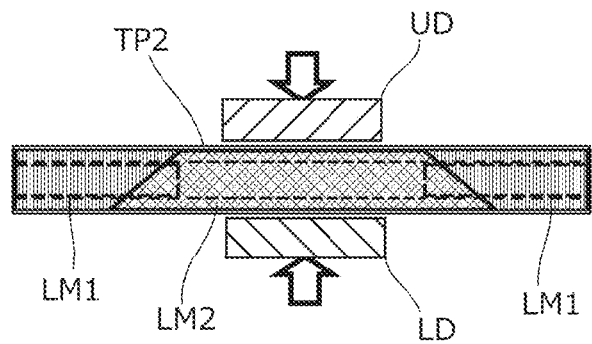
FIG. 24 is a view similar to FIG. 15, illustrating a main heating step of a manufacturing method according to a fourth modified example of the second embodiment.

FIG. 24 is a diagram similar to FIG. 15, illustrating a main heating step of a manufacturing method according to a third modified example. According to the present modified example, a preform body in which first laminate bodies LM1 are respectively inserted to an inner side of both ends of the second laminate body LM2 is used. The upper mold UD and the lower mold LD are plate shaped, which heat and press a center (position where the first laminate bodies LM1 are not present) of the preform body. The other configurations are similar to the embodiments described above.

Figure 25:
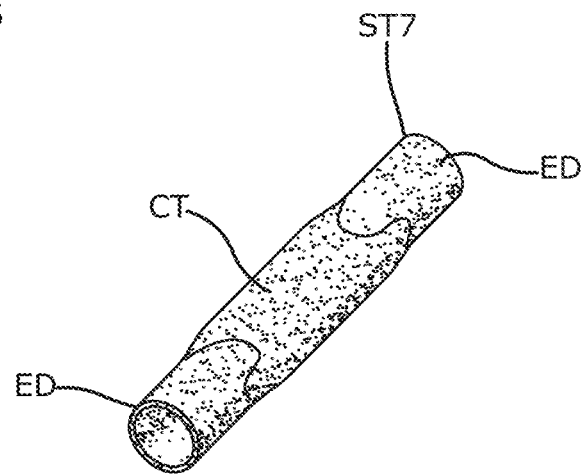
FIG. 25 is a perspective view of a structural body of a modified cross-sectional shape manufactured by the manufacturing method according to a fourth modified example.

According to the fourth modified example, by heating and pressurizing the upper mold UD and the lower mold LD, a structural body (modified cross-section structural body) ST7 having a modified cross-sectional shape illustrated in FIG. 25 is manufactured. The structural body ST7 includes a flatly crushed center portion CT and hollow cylinder-shaped end portions ED. It is also possible to ensure communication between both end portions ED in the interior of the center portion CT without completely crushing the center portion CT of the structural body ST7.

The molding die can be angle-shaped rather than plate-shaped, according to which the second laminate body LM2 is crushed by pressurizing so that a structural body that does not deteriorate the continuity of fiber in the cross-sectional direction can be formed.

Other Modified Examples

Figure 26:
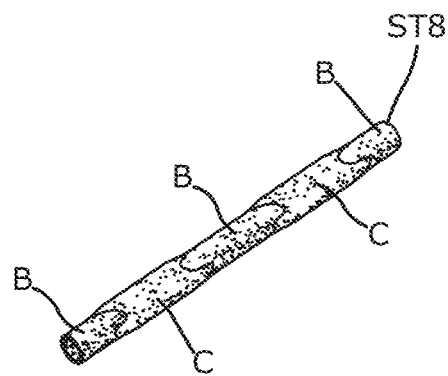
FIG. 26 is a perspective view of a structural body similar to the fourth modified example.
Figure 27:
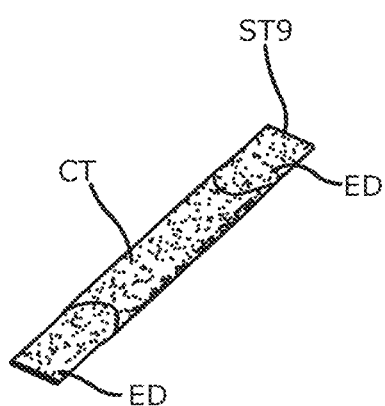
FIG. 27 is a perspective view of a structural body similar to the second modified example.

FIG. 26 is a perspective view of a structural body ST8 similar to the fourth modified example. The structural body ST8 includes hollow cylindrical portions B formed at three positions and plate portions C formed at two positions. FIG. 27 is a perspective view of a structural body ST9 similar to the second modified example. In the structural body ST9, the end portions ED are crushed into a flat plate shape by the molding dies according to the second embodiment, and the center portion CT is formed to have an oval cross-sectional shape by the molding die according to the first embodiment. Since the first laminate body LM1 is deformable to a certain extent, by pressing the body by molding dies, the structural body can have an arbitrary cross-sectional shape at an arbitrary position in the longitudinal direction, rather than being limited to the cylindrical cross-sectional shape, as according to the structural body ST9. That is, according to the present embodiment, a structural body having a modified end surface with an arbitrary shape can be formed by varying the amount of deformation at the center portion and the amount of deformation at the end portions of the preform body. However, by using a molding die having an identical shape along the longitudinal direction, a structural body having a polygonal cross-section as according to the first embodiment can be formed.

As described, according to the present embodiment, a preform body including a first laminate body LM1 that can endure external pressure during molding and a second laminate body LM2 having been controlled to a state prior to complete curing is manufactured by a relatively easy method, and by using the preform body, an FRP pipe having an oval or a polygonal closed cross-sectional shape, or an FRP pipe having in addition thereto a contour with end portions and/or a center portion crushed into a flat plate shape, having a stable quality, can be manufactured efficiently from the viewpoint of productivity and cost.

The structural body formed according to the present embodiment can have the cross-sectional shape at an arbitrary position along the longitudinal direction formed in an arbitrary cross-sectional shape, such as a circular cross-section (including an oval cross-section) or a non-circular cross-section (such as a polygonal cross-section, a flat plate-shaped cross-section, or a free-shaped cross-section).

Third Embodiment

Figure 28:
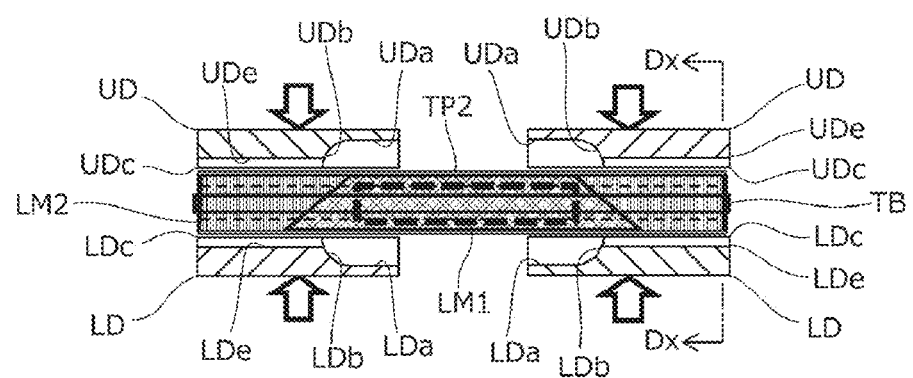
FIG. 28 is a view similar to FIG. 15, illustrating a main heating step of a manufacturing method according to a third embodiment.
Figure 29:
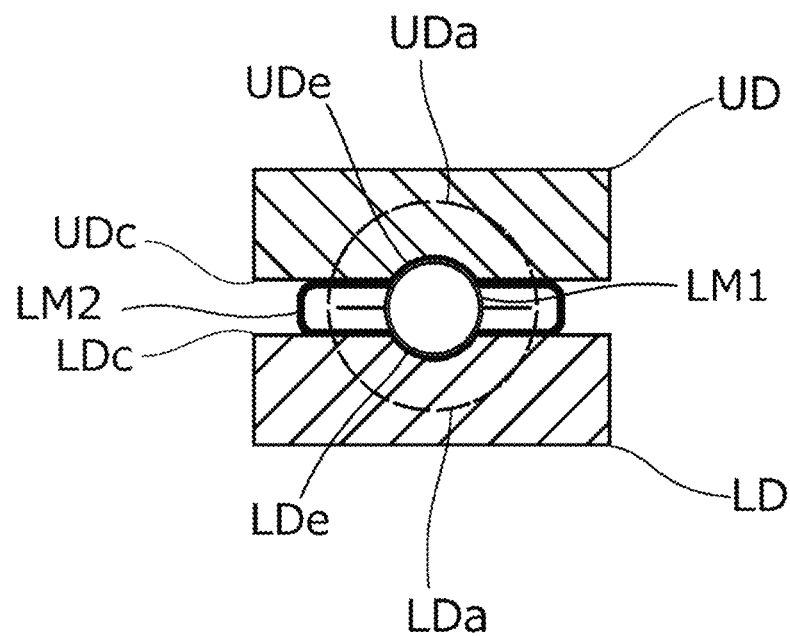
FIG. 29 is a view illustrating a state of the configuration of FIG. 28 during mold clamping as viewed in the arrow direction at the Dx-Dx cross-section.

FIG. 28 is a diagram similar to FIG. 15, illustrating a main heating step of a manufacturing method according to a third embodiment. FIG. 29 is a view illustrating a state where a configuration of FIG. 28 during mold clamping is viewed in an arrow direction at a Dx-Dx cross-section.

According to the present embodiment, a preform body having a first laminate body LM1 whose longitudinal dimension is shorter than the second laminate body LM2 inserted to a longitudinal center of the second laminate body LM2 is used. Further, the upper mold UD includes an upper groove UDe having an arc-shaped cross-section that connects an end portion of the upper mold UD and the transition surface UDb. Meanwhile, the lower mold LD includes a lower groove LDe having an arc-shaped cross-section that connects an end portion of the lower mold LD and the transition surface LDb. The other configurations (including the steps immediately prior to the main heating step) are similar to the embodiment described earlier.

As illustrated in FIG. 28, a hollow bar member (another member) TB that has a longitudinal dimension approximately equal to the second laminate body LM2 and that is formed of fiber reinforced plastics such as CFRP, ceramics, resin or metal (such as stainless steel, copper, brass, or aluminum) is inserted to the inner side of the second laminate body LM2 and the first laminate body LM1. However, the longitudinal dimension of the bar member TB can be set longer than the longitudinal dimension of the second laminate body LM2 (the same applies to the following embodiments). Further, the preform body and the bar member TB are arranged between the upper mold UD and the lower mold LD so that the recessed surfaces UDa and LDa are positioned on an outer side in the radial direction of the end portion of the first laminate body LM1, and at the same time, the upper grooves UDe and the lower grooves LDe are positioned on an outer side in the radial direction of the end portion of the bar member TB.

In this state, when the upper mold UD and the lower mold LD are relatively approximated to perform mold clamping in this state, the upper grooves UDe and the flat surface UDc, and the lower grooves LDe and the flat surface LDc, are positioned to sandwich the end portions of the preform body. Since the thermosetting resin of the second laminate body LM2 is heated to a curing level of 90% or lower in the previous preheating step, the pressure applied by the upper grooves UDe and the lower grooves LDe causes a portion of the second laminate body LM2 to be closely adhered to an outer circumference of the bar member TB, and the remaining second laminate body LM2 at both sides of the bar member TB can be easily deformed in a flatly crushed manner by the flat surfaces UDc and LDc (refer to FIG. 29). By applying an adhesive agent or winding an adhesive film in advance on an outer circumference surface of the bar member TB that comes into close contact with the second laminate body LM2, the adhesion of the bar member TB and the second laminate body LM2 can be enhanced.

In this state, since the second tape TP2 is wound around the second laminate body LM2 with predetermined tension, even when the second laminate body LM2 is crushed to a flat plate-shape, the outer surfaces at both edges on the end portions of the second laminate body LM2 (right and left sides in FIG. 29) have a curved surface with a constant or gradually changing curvature due to the shape retaining function of the second tape TP2. Thereby, the quality of external appearance of the structural body and strength thereof against bending and torsion can be improved. Further, since the reinforcing fibers at both edges are curved without being bent (i.e., continuity of the fibers is maintained), an even higher strength is ensured. However, depending on the cross-sectional shape of the structural body, the second tape TP2 is not necessarily used.

Meanwhile, a center portion of the second laminate body LM2 is maintained to a cylindrical shape resisting the pressurizing force of the molding die by the cured first laminate body LM1. Specifically, the pressurizing force is not directly applied to the second laminated body LM2 at the outer circumference of the first laminate body LM1 since the recessed surfaces UDa and LDa are provided, so that a highly accurate cylindrical shape can be maintained. Moreover, in addition to the first laminate body LM1 being maintained to a cylindrical shape, end portions of the bar member TB are maintained at the center of the molding die via the upper grooves UDe and the lower grooves LDe, so that the outer circumference of the bar member TB inserted to the inner side of the first laminate body LM1 will not be closely adhered to the inner circumference of the first laminate body LM1, and a space SP having a highly accurate circular tube shape (FIGS. 31 and 32 described later) will be formed therebetween.

Furthermore, by heating the upper mold UD, the lower mold LD, and the entire second laminate body LM2 using a heater or an oven not shown through the main heating step, the second laminate body LM2 can be completely cured in the deformed state.

Figure 30:
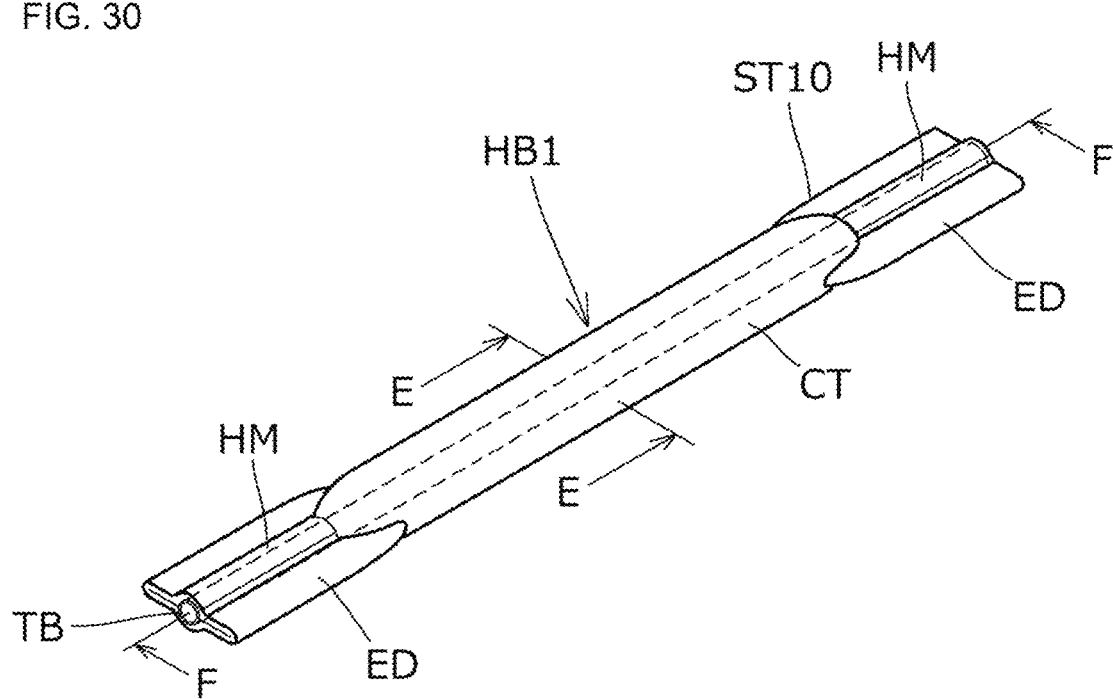
FIG. 30 is a perspective view of a structural body having a modified cross-sectional shape manufactured by the manufacturing method according to the present embodiment, and a composite structural body formed of a bar member.
Figure 31:
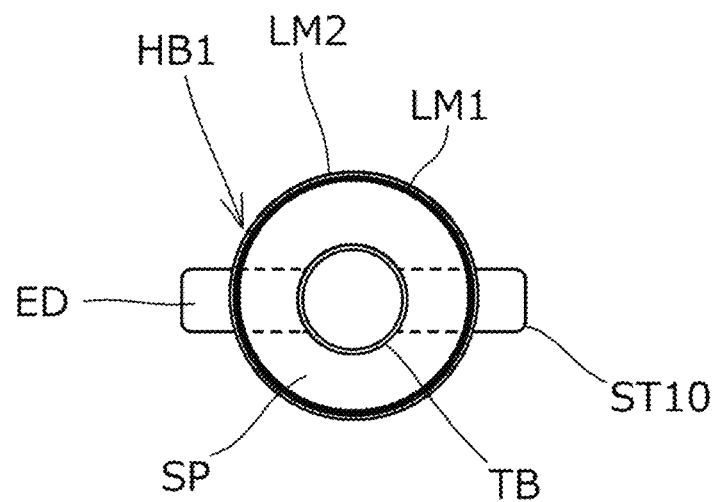
FIG. 31 is a view illustrating a state of a structure of FIG. 30 as viewed in the arrow direction at the E-E cross-section.
Figure 32:
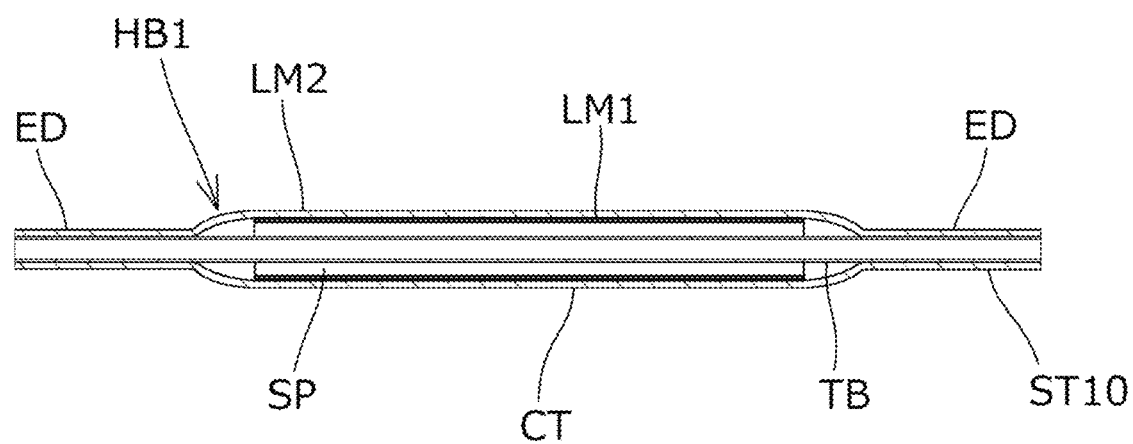
FIG. 32 is a view illustrating a state of a structure of FIG. 30 as viewed in the arrow direction at the F-F cross-section.

Thereafter, by separating the upper mold UD and the lower mold LD and peeling off the second tape TP2, a composite structural body HB1 composed of a structural body (modified cross-section structural body) ST10 having a modified cross-sectional shape and the bar member TB as illustrated in FIGS. 30 to 32 can be obtained. The structural body ST10 includes a hollow cylinder-shaped center portion CT and flat plate-shaped end portions ED. A part of an inner circumference of the end portions ED of the second laminate body LM2 is closely adhered to the outer circumference of the bar member TB, and the remaining inner circumferences are mutually closely adhered. However, vicinity of end portions of the second laminate body LM2 that are protruded outward in the longitudinal direction from the first laminate body LM1 and the bar member TB are not in contact with each other. Further, a raised portion HM having a crescentic cross section and extending in the longitudinal direction of the structural body ST10 is formed at the center of upper end lower surfaces of the end portions ED in correspondence with the bar member TB.

According to the present embodiment, as illustrated in FIGS. 31 and 32, a space SP that is sealed with respect to the exterior of the structural body ST10 is formed between the inner circumference of the structural body ST10 and the outer circumference of the bar member TB. The space SP is also sealed with respect to the inner space of the hollow bar member TB. Therefore, by supplying a flow of a first fluid within the space SP and by supplying a flow of a second fluid within the bar member TB, for example, heat exchange can be performed between the first fluid and the second fluid.

Alternatively, by forming a plurality of through holes on a peripheral wall of the hollow bar member TB and connecting them to an exhaust pipe of an internal-combustion engine, the composite structural body HB1 can function as a muffler with the space SP serving as an expansion chamber. Further, the bar member TB is not only limited to a hollow shape, and it can be a solid shape. Further, male screw/female screw structures or Swagelok structures (or flexible pipe connectors) can be provided at end portions of the hollow bar members TB of a plurality of composite structural bodies HB1 to mutually connect the bodies HB1. Thereby, the number of composite structural bodies HB1 being connected can be adjusted in response to the specification of heat exchangers so as to realize packaging. Further, when gas is sealed in the airtight space SP, the structural body ST10 will have buoyancy, so that by passing a cord or rope to the inner side of the hollow bar members TB of the plurality of composite structural bodies HB1 and mutually connecting the structural bodies HB1, they can be used as a float, a buoy, or an oil fence. Further, by forming the peripheral wall of the space SP of the hollow bar member TB as a permeable membrane structure or an ion (electron) exchange membrane, the composite structural body HB1 can be utilized as a structural body for a water cleaning filter or a battery.

Other Modified Examples

Figure 33:
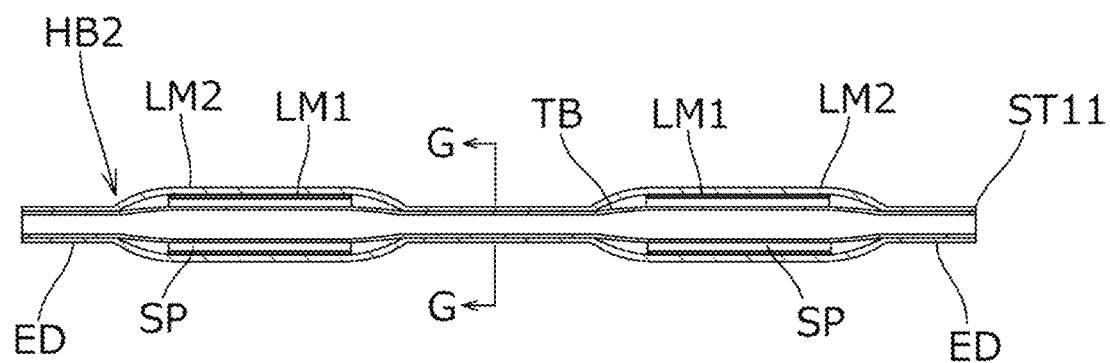
FIG. 33 is a cross-sectional view similar to FIG. 32 of a composite structural body similar to the third embodiment.
Figure 34:
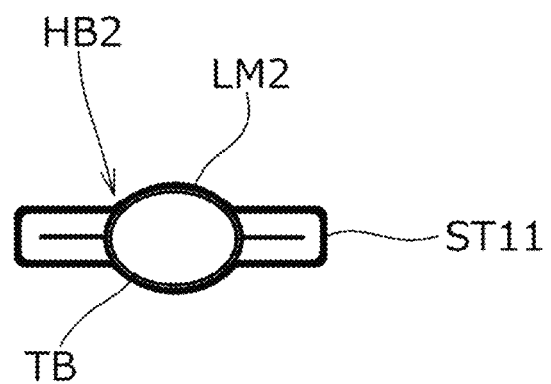
FIG. 34 is a view illustrating a state of a structure of FIG. 33 as viewed in the arrow direction at the G-G cross-section.

FIG. 33 is a cross-sectional view similar to FIG. 32 of a composite structural body HB2 similar to the third embodiment. FIG. 34 is a view illustrating a state where a configuration of FIG. 33 is viewed in the arrow direction at a G-G cross-section.

In the present embodiment, a preform body in which two first laminate bodies LM1 having a common shape are arranged spaced apart within the second laminate body LM2, the bar member TB is inserted to the preform body, and a main heating step is executing using two sets of molding dies similar to FIG. 28, to thereby form a composite structural body HB2 composed of a structural body (modified cross-sectional structural body) ST11 having a modified cross-sectional shape and the bar member TB. The composite structural body HB2 is airtightly sealed with respect to the exterior, and includes two independent spaces SP.

By increasing the pressing force against the mold clamping direction when closely adhering the inner circumference of the first laminate bodies LM1 to the outer circumference of the hollow bar member TB, the cross-sectional shape of the bar member TB can be deformed into an oval shape, as illustrated in FIG. 34. The cross-sections of both ends of the composite structural body HB2 can be deformed similarly. However, since external pressure in the radial direction is not applied to the bar member TB on the inner side of the second laminate body LM2, the cross-section of the bar member TB is maintained to a circular shape. The cross-sectional shape of the bar member TB is not limited to a circular shape, and it can arbitrarily have other cross-sectional shapes such as a hexagonal shape or an octagonal shape. Further, it is also possible to use a bar member having a cross-sectional shape that is locally deformed in advance to form the composite structural body HB2.

Figure 35:
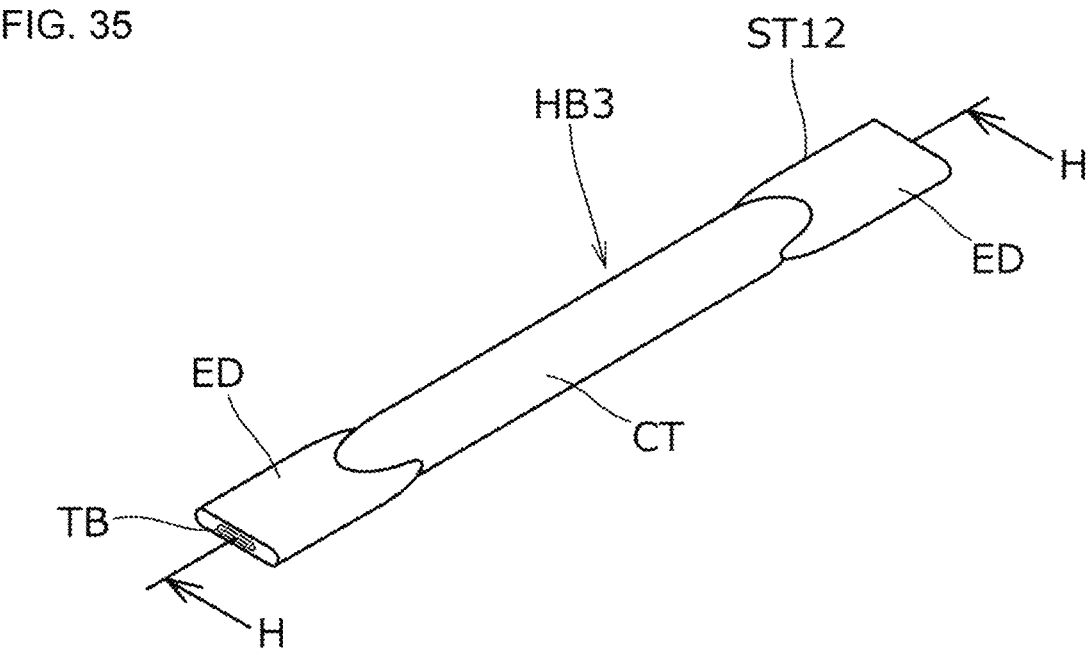
FIG. 35 is a perspective view similar to FIG. 30, illustrating a composite structural body similar to the third embodiment.
Figure 36:
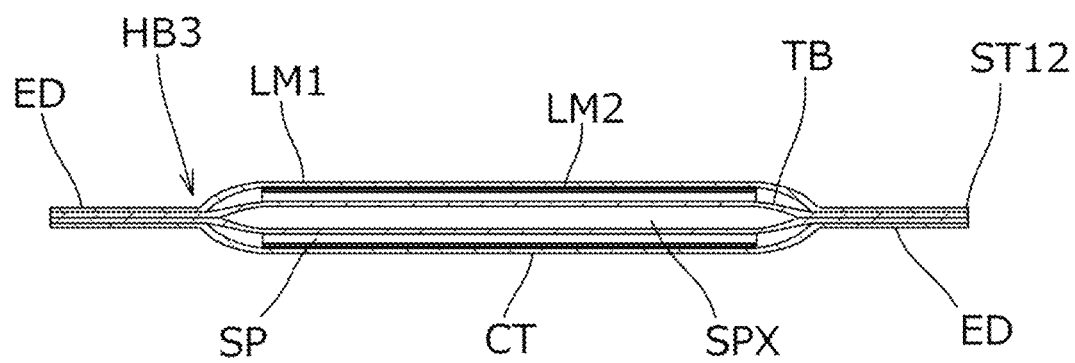
FIG. 36 is a view illustrating a state of the configuration of FIG. 35 as viewed in the arrow direction in the H-H cross-section.

FIG. 35 is a perspective view similar to FIG. 30 of a composite structural body HB3 that is similar to the third embodiment. FIG. 36 is a view illustrating a state where the configuration of FIG. 35 is viewed in the arrow direction at an H-H cross-section. The composite structural body HB3 of the present modified example uses the molding die illustrated in FIG. 15 instead of the molding die illustrated in FIG. 28 to obtain a structural body (modified cross-section structural body) ST12 having a modified cross-sectional shape and a bar member TB.

More specifically, similar to the third embodiment, by inserting a hollow bar member TB formed of fiber reinforced plastic such as CFRP, resin, or metal having a longitudinal dimension approximately equal to that of the second laminate body LM2 to the inner side of the second laminate body LM2 and the first laminate body LM1, and pressurizing the same using the molding die illustrated in FIG. 15, a composite structural body HB3 in which the end portions ED of the first laminate body LM1 and end portions of the bar member TB are flatly crushed can be obtained. The other configurations are similar to the embodiment illustrated in FIG. 30.

According to the present modified example, an airtightly sealed space SP is formed between the first laminate body LM1 and the bar member TB, and a different space SPX is formed inside the bar member TB having both ends crushed. Since the space SP and the space SPX are not communicated, different gases or fluids can be sealed therein. By forming through holes to the end portions ED and engaging the same with other components by passing bolts therethrough, the composite structural body HB3 can be used as a reinforcing material.

Figure 37:
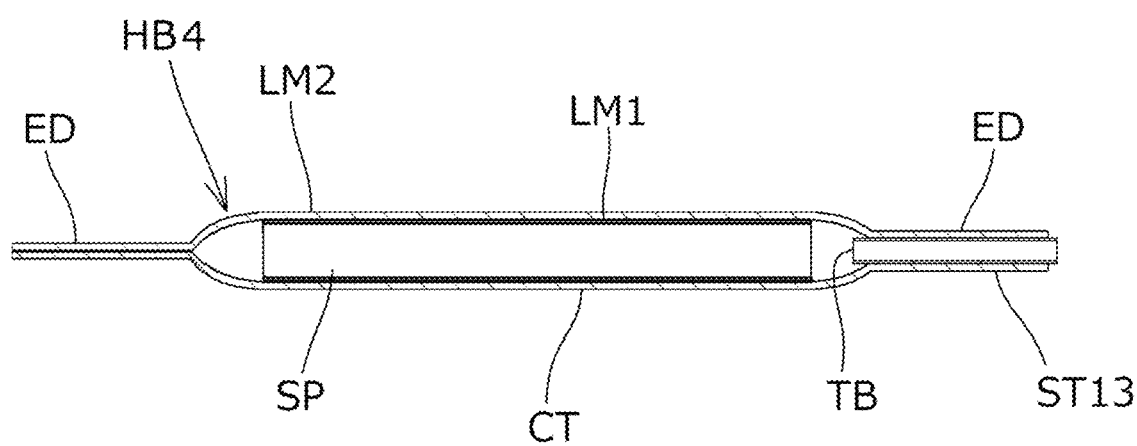
FIG. 37 is a cross-sectional view similar to FIG. 32, illustrating a composite structural body similar to the third embodiment.

FIG. 37 is a cross-sectional view similar to FIG. 32 illustrating a composite structural body that is similar to the third embodiment. A composite structural body HB4 of the present modified example is composed of a structural body (modified cross-section structural body) ST13 having a modified cross-sectional shape, and the bar member TB. The hollow bar member TB is inserted in a closely adhered state to only one of the end portions ED of the second laminate body LM2 protruded outward in the longitudinal direction of the first laminate body LM1. Further, the other end portion ED of the second laminate body LM2 protruded outward in the longitudinal direction of the first laminate body LM1 is shaped so that an opening thereof is closed without having the bar member TB inserted thereto. The areas of the vicinity of both ends of the second laminate body LM2 protruded outward in the longitudinal direction of the first laminate body LM1 adjoin the space SP. Descriptions of common configurations will be omitted.

According to the present modified example, the space SP can be utilized as a normal pressure or pressurized tank for liquid or gas. Generally, valves are connected to a piping connected to a tank. In the present modified example, screw threads can be formed to the bar member TB protruded from the end portions ED so as to enable direct connection to a valve not shown, and liquid or gas can be stored in the center portion CT. According to such a structure, liquid and gas can be moved between the center portion CT and the exterior via the valve. Further, the bar member TB and other piping can be coupled via a joint.

INDUSTRIAL APPLICABILITY

Regarding the structural body of the present invention, studies are progressed for walking assistance and caring assistance, and when applied as a frame member of a power suit that has been put to practice in some parts, the properties of the CFRP material (light weight, high strength, and high rigidity) and the modified cross-section/polygonal structure can be utilized effectively. Further, by utilizing the structural body of the present invention to a vehicle such as a motorcycle or an automobile, weight reduction can be realized while ensuring strength, and it can contribute to improved fuel efficiency. Especially, the composite structural body composed of the bar member and the structural body may have toughness, depending on the material of the bar member, in addition to having light weight and high strength, so that it can have a wide area of application in addition to the frame for a walking/caring assistance or a structural body for a motorcycle/automobile, and it can contribute to the advancement of various industrial fields.

DESCRIPTION OF THE REFERENCE NUMERAL

PS1-PS6, PS11-PS17 prepreg sheet
MD mandrel
CY cylindrical core member
TP tape
OV oven
RD rotary drive body
UD upper mold
LD lower mold
LM1 first laminate body
LM2 second laminate body
ST1-ST13 structural body
TB bar member
HB1-HB4 composite structural body

The invention claimed is:

1. A method for manufacturing a structural body comprising:
   a first winding step of forming a cylindrical inner laminate body by winding a plurality of first composite materials including first reinforcing fibers and an uncured first thermosetting resin around a mandrel;
   a first compressing step of compressing a circumference of the inner laminate body;
   a first heating step of heating the inner laminate body until the first thermosetting resin is completely cured;
   a second winding step of forming a cylindrical outer laminate body by winding a plurality of second composite materials including second reinforcing fibers and an uncured second thermosetting resin around a circumference of the inner laminate body being cured;
   a second compressing step of compressing a circumference of the outer laminate body;
   a preheating step of heating the outer laminate body to a state prior to complete curing of the second thermosetting resin;
   an extracting step of extracting the mandrel from the outer laminate body and the inner laminate body; and
   a main heating step of placing the outer laminate body and the inner laminate body in a molding die, and heating the outer laminate body until the second thermosetting resin is completely cured while pressurizing the outer laminate body to deform the outer laminate body.

2. The method for manufacturing a structural body according to claim 1, further comprising:
   in the first compressing step, winding a first tape or first film around an entire circumference of the inner laminate body to compress the inner laminate body; and
   after the first heating step, peeling off the first tape or first film off from an outer circumference of the inner laminate body.

3. The method for manufacturing a structural body according to claim 1, further comprising:
   in the second compressing step, winding a second tape or second film around an entire circumference of the outer laminate body to compress the outer laminate body; and
   after the main heating step, peeling off the second tape or second film from an outer circumference of the outer laminate body.

4. The method for manufacturing a structural body according to claim 1,
   wherein the first composite material is a prepreg obtained by impregnating the first reinforcing fibers with the first thermosetting resin, and the second composite material is a prepreg obtained by impregnating the second reinforcing fibers with the second thermosetting resin.

5. The method for manufacturing a structural body according to claim 1,
   wherein, in the preheating step, the outer laminate body is heated so that a curing level of the second thermosetting resin is within a range of 30 to 90%.

6. The method for manufacturing a structural body according to claim 1,
   wherein the outer laminate body is formed in a manner protruding from the inner laminate body outward in a longitudinal direction, and in the main heating step, an amount of deformation of an end portion side of the outer laminate body is varied from an amount of deformation of a center side of the inner laminate body.

7. The method for manufacturing a structural body according to claim 1,
   wherein a longitudinal dimension of the outer laminate body is set longer than a longitudinal dimension of the inner laminate body,
   the method further comprises, after the extracting step, a step of inserting a hollow or a solid bar member into the outer laminate body and the inner laminate body,
   in the main heating step, the outer laminate body, the inner laminate body, and the bar member are placed a molding die, and the outer laminate body is heated until the second thermosetting resin is completely cured, and
   the outer laminate body is closely adhered to the bar member by pressurizing.

8. The method for manufacturing a structural body according to claim 7,
   wherein a sealed space is formed between the bar member and the outer laminate body supported by the inner laminate body.

9. The method for manufacturing a structural body according to claim 8,
   wherein the bar member is hollow, and the sealed space is not communicated with an interior of the bar member.

* * * * *